(12) United States Patent
Ogiso

(10) Patent No.: US 8,488,713 B2
(45) Date of Patent: Jul. 16, 2013

(54) INFORMATION PROCESSING APPARATUS, ENCODING METHOD AND SIGNAL TRANSMISSION METHOD

(75) Inventor: Takayuki Ogiso, Tokyo (JP)

(73) Assignee: Sony Corporation, Tokyo (JP)

( * ) Notice: Subject to any disclaimer, the term of this patent is extended or adjusted under 35 U.S.C. 154(b) by 985 days.

(21) Appl. No.: 12/554,130

(22) Filed: Sep. 4, 2009

(65) Prior Publication Data

US 2010/0061467 A1     Mar. 11, 2010

(30) Foreign Application Priority Data

Sep. 8, 2008   (JP) ............................... P2008-230070

(51) Int. Cl.
   *H04L 27/00*   (2006.01)
(52) U.S. Cl.
   USPC ........................................................ 375/295
(58) Field of Classification Search
   USPC ........................................................ 375/295
   See application file for complete search history.

(56) References Cited

U.S. PATENT DOCUMENTS

| | | | | |
|---|---|---|---|---|
| 4,189,621 A | * | 2/1980 | Scott | 375/239 |
| 5,487,070 A | * | 1/1996 | Furukawa | 370/517 |
| 2002/0075945 A1 | * | 6/2002 | Farine et al. | 375/148 |
| 2009/0022050 A1 | * | 1/2009 | Ohta | 370/210 |

FOREIGN PATENT DOCUMENTS

JP          3-109843          5/1991

* cited by examiner

*Primary Examiner* — Chieh M Fan
*Assistant Examiner* — Tanmay Shah
(74) *Attorney, Agent, or Firm* — Finnegan, Henderson, Farabow, Garrett & Dunner, L.L.P.

(57) ABSTRACT

There is provided an information processing apparatus including a data encoding unit that generates an encoded signal by encoding first input data based on CMI (Coded Mark Inversion) coding rules and encoding second input data using errors of the CMI coding rules, a clock signal addition unit that generates a transmission signal by synchronously adding a clock signal having an amplitude value larger than that of the encoded signal to the encoded signal generated by the data encoding unit, and a signal transmission unit that transmits the transmission signal generated by the clock signal addition unit.

7 Claims, 18 Drawing Sheets

FIG. 10

EXAMPLE OF CMI CODING

NRZ Code: 1, 0, 1, 0, 1, 1, 0, 0, 1

1bit → 2bit

CMI Code: 11, 00, 11, 00, 11, 11, 00, 01, 11

CMI CODING RULES

| INPUT | OUTPUT FOR LAST INPUT 1 | CURRENT OUTPUT |
|---|---|---|
| 0 | — | 01 |
| 1 | 00 | 11 |
|   | 11 | 00 |

FLOW OF CMI CODING (+): STATE TRANSITION FROM 11
(−): STATE TRANSITION FROM 00

FLOW OF CODING PROCESSING

FLOW OF DECODING PROCESSING (1)

CONFIGURATION EXAMPLE OF DC OFFSET CORRECTING UNIT 450

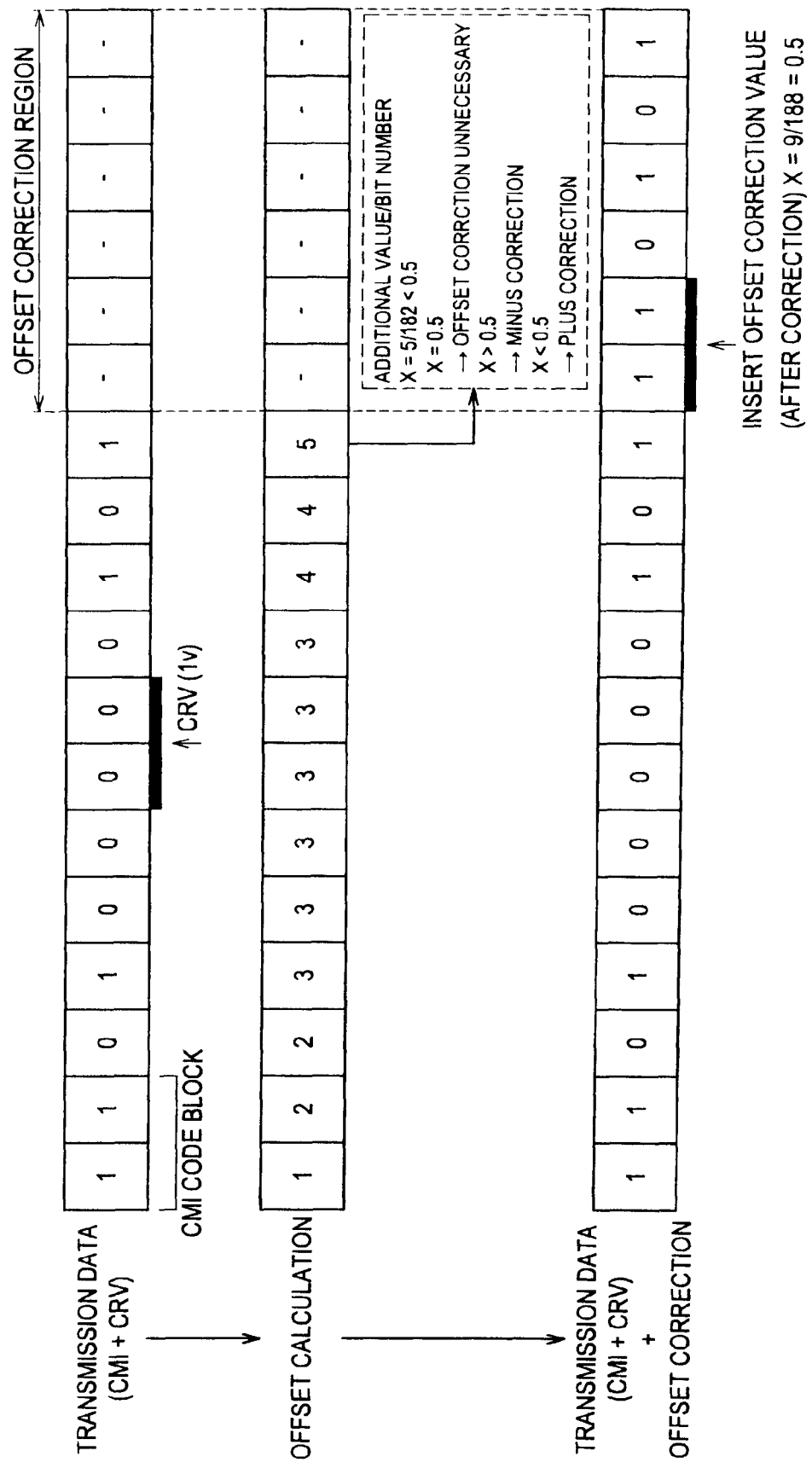

INFORMATION PROCESSING APPARATUS, ENCODING METHOD AND SIGNAL TRANSMISSION METHOD

BACKGROUND OF THE INVENTION

1. Field of the Invention

The present invention relates to an information processing apparatus, an encoding method, and a signal transmission method.

2. Description of the Related Art

Mobile terminals exemplified by mobile phones frequently include a moveable member as a connecting portion between an operation portion operated by a user and a display portion in which information is displayed. For example, an opening/closing structure of a folding mobile phone is typical of such a movable member. Further, recent mobile phones have, in addition to the calling and mail functions, a viewing function of images or an imaging function and thus, it is necessary for the connecting portion to be movable complexly in accordance with usage of the user. When the viewing function of images is used, for example, the user desires to direct the display portion toward the user and the operation portion unnecessary for viewing put away. Thus, a structure allowing the orientation or position of the display portion to change in accordance with usage thereof when a mobile phone is used as an ordinary phone, used as a digital camera, used as a TV set and the like has been desired.

As a matter of fact, a large number of signal lines and power lines are wired through the connection portion between the operation portion and display portion. For example, several tens of wires are connected in parallel in the display portion (see FIG. 1). Thus, if a movable member capable of making complex motions described above is used as a connection portion, reliability and the like of such wires will significantly decrease. For such reasons, technology used is being shifted from the parallel transmission method to the serial transmission method (see FIG. 2) to reduce the number of signal lines in the connecting portion. Naturally, a technological shift for similar reasons is not limited to the world of mobile phones and occurs in the world of various electronic devices in which complex wiring is demanded. In addition to the above reason, serialization also seeks to reduce electromagnetic noise (EMI: Electro Magnetic Interference).

In the serial transmission method, transmission data is transmitted after being encoded according to a predetermined method. As the coding mode, for example, the NRZ (Non Return to Zero) coding mode, Manchester coding mode, or AMI (Alternate Mark Inversion) coding mode is used. Japanese Patent Application Laid-Open No. 3-109843, for example, discloses a technology to transmit data by using the AMI code, which is a typical example of bipolar code. Japanese Patent Application Laid-Open No. 3-109843 also discloses a technology to represent a data clock by a media value of a signal level before transmission and reproduce the data clock based on the signal level on the receiving side.

SUMMARY OF THE INVENTION

A signal in NRZ coding mode among the above coding modes contains a DC component. Thus, it is difficult to transmit a signal in the NRZ coding mode together with a DC component of a power supply or the like. On the other hand, a signal in the Manchester coding mode or AMI coding mode does not contain a DC component. Thus, such a signal can be transmitted together with a DC component of a power supply or the like. However, it is necessary for the Manchester coding mode or AMI coding mode to set up a PLL (Phase-Locked Loop) circuit to reproduce a data clock of a signal on the receiving side. Thus, with a PLL circuit on the receiving side, current consumption will increase accordingly. Moreover, data is transmitted by using rise and fall shapes of amplitude in the Manchester coding mode and thus, it is necessary to transmit data at a clock two times faster than the data rate. As a result, a higher clock operation will cause an increase in current consumption.

In view of the above issues, a code that does not contain any DC component and needs no PLL circuit during clock reproduction and a signal transmission technology using the code have been developed. According to the technology, encoding is performed in such a way that a first bit value of input data containing the first bit value and a second bit value that are mutually different is represented by a plurality of first amplitude values, the second bit value is represented by a second amplitude value that is different from the first amplitude values, the same amplitude value is not taken successively, and polarity of the amplitude value is reversed in each period before transmission. The technology is applied to an AMI code or a code in partial response mode to realize fast data transmission. However, when a transmission method according to the technology is used, it is necessary to form a data frame for transmission of additional data when the additional data is transmitted separately from a main sequence of data.

The present invention has been made in view of the above issues and it is desirable to provide an information processing apparatus capable of transmitting additional data separately from a main sequence of data using a code that does not contain any DC component and capable of reproducing a clock without using any PLL on the receiving side, an encoding method, and a signal transmission method. In particular, it is desirable to provide an information processing apparatus capable of transmitting additional data using the same frame structure as that of a data frame used for transmission of a main sequence of data, an encoding method, and a signal transmission method.

In order to solve the above issue, according to an embodiment of the present invention, there is provided an information processing apparatus, including: a data encoding unit that generates an encoded signal by encoding first input data based on CMI (Coded Mark Inversion) coding rules and encoding second input data using errors of the CMI coding rules; a clock signal addition unit that generates a transmission signal by synchronously adding a clock signal having an amplitude value larger than that of the encoded signal to the encoded signal generated by the data encoding unit; and a signal transmission unit that transmits the transmission signal generated by the clock signal addition unit.

The data encoding unit may be configured to adjust amplitudes of the encoded signal so that a central value of amplitude becomes 0. In this case, the clock signal addition unit generates the transmission signal by synchronously adding the clock signal to the encoded signal whose central value of amplitude is adjusted to 0.

A data frame to form the encoded signal may be provided with an area in which correction data to correct an average amplitude value of the encoded signal in the data frame is stored. The data encoding unit generates the encoded signal by storing the correction data in the storage area of the correction data so that the average amplitude value of the encoded signal becomes 0.

The information processing apparatus may further include: a signal receiving unit that receives the transmission signal via a predetermined transmission line; and a clock component detection unit that detects a clock component contained in the transmission signal based on a reversal period by detecting the reversal period of polarity held by the transmission signal received by the signal receiving unit. In this case, an input data decoding unit uses the clock component detected by the clock component detection unit to decode the first and second input data.

The predetermined transmission line may be a power line through which a DC current is passed. In this case, the transmission signal is transmitted after being superimposed on the DC current by the signal transmission unit and separated from the DC current by the signal receiving unit.

In order to solve the above issue, according to another embodiment of the present invention, there is provided an encoding method including the steps of: generating an encoded signal by encoding first input data based on CMI (Coded Mark Inversion) coding rules and encoding second input data using errors of the CMI coding rules; and generating a transmission signal transmitted through a predetermined transmission line by synchronously adding a clock signal having an amplitude value larger than that of the encoded signal to the encoded signal generated in the encoding step.

In order to solve the above issue, according to another embodiment of the present invention, there is provided a signal transmission method including the steps of: generating an encoded signal by encoding first input data based on CMI (Coded Mark Inversion) coding rules and encoding second input data using errors of the CMI coding rules; generating a transmission signal by synchronously adding a clock signal having an amplitude value larger than that of the encoded signal to the encoded signal generated in the encoding step; transmitting the transmission signal generated in the clock addition step; receiving the transmission signal via a predetermined transmission line; detecting a clock component contained in the transmission signal based on a reversal period by detecting the reversal period of polarity held by the transmission signal received in the signal receiving step; and decoding the first and second input data by using the clock component detected in the clock component detection step.

In order to solve the above issue, according to another embodiment of the present invention, there is provided a program to cause a computer to realize functions held by the above information processing apparatus. Further, a computer readable recording medium in which the program is recorded may be provided.

According to the embodiments of the present invention described above, additional data can simultaneously be transmitted separately from a main sequence of data using a CMI-based code that does not contain any DC component and capable of reproducing a clock without using any PLL on the receiving side. In particular, additional data can be transmitted using the same frame structure as that of a data frame used for transmission of a main sequence of data.

BRIEF DESCRIPTION OF THE DRAWINGS

FIG. 10 shows coding rules for a CMI code;
FIG. 20 shows the flow of a DC offset correction method according to the present embodiment.

DETAILED DESCRIPTION OF THE PREFERRED EMBODIMENTS

Figure 1:
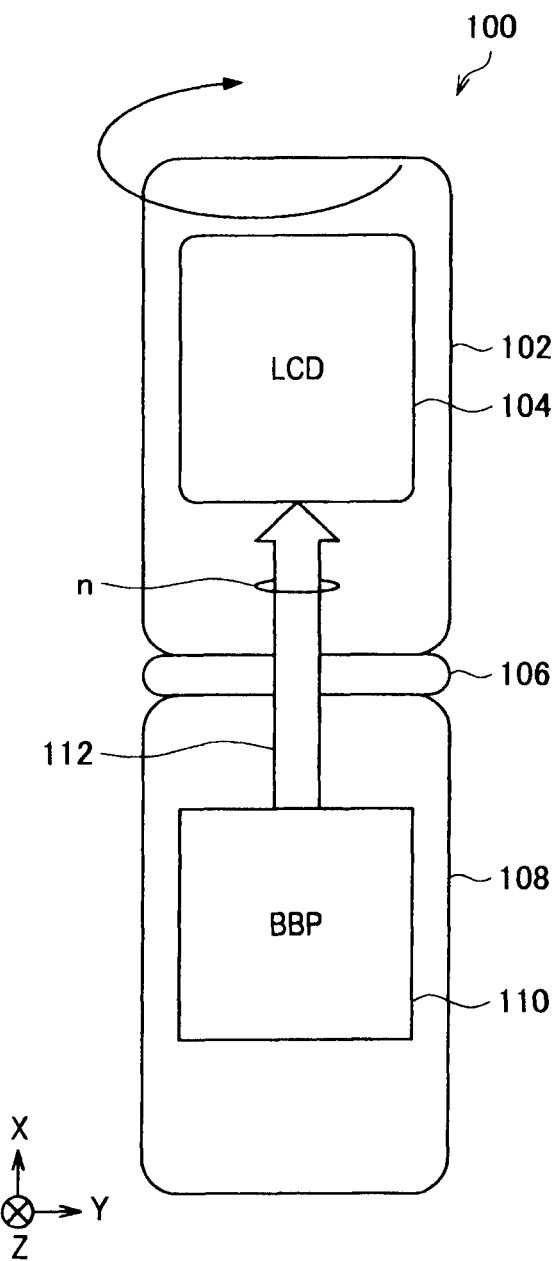
FIG. 1 shows a configuration example of a mobile terminal.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of the Description]

The flow of the description about an embodiment of the present embodiment described below will briefly be mentioned. First, technical issues of a mobile terminal or the like that adopts the parallel transmission method will briefly be described with reference to FIG. 1. Next, issues of signal transmission technology that adopts the serial transmission method will be described with reference to FIG. 2 to FIG. 6.

Next, a new signal transmission technology developed to solve issues of the signal transmission technology that adopts the serial transmission method will be described with reference to FIG. 7 to FIG. 13. The new signal transmission technology concerns a mode in which a signal is transmitted using a code that does not contain any DC component and needs no PLL circuit during clock reproduction. A technology according to an embodiment of the present invention described below is a technology developed by further devising the new transmission method.

Next, coding rules for the CMI (Coded Mark Inversion) mode and the flow of encoding processing in the CMI mode will be described with reference to FIG. 10 to FIG. 12. Next, the function configuration of a mobile terminal according to an embodiment of the present invention will be described with reference to FIG. 13. Also, an encoding processing method by the mobile terminal will be described with reference to FIG. 14. Further, a circuit configuration example of a signal processing unit held by the mobile terminal will be described with reference to FIG. 15. Next, the overall flow of a signal processing method according to the embodiment will be described with reference to FIG. 16 and FIG. 17.

Next, coding rules for CRV (Code Rule Violation) added CMI code and an encoding method will be described with reference to FIG. 18. Next, the configuration of a correction means to correct a DC offset of a data frame will be described with reference to FIG. 19. Next, a correction method of the DC offset by the correction means will be described with reference to FIG. 20. Lastly, technical ideas of the embodiment will be summarized and operation effects obtained from the technical ideas will be described.

[Summary of Issues]

Before describing technology according to an embodiment of the present invention in detail, issues to be solved by the embodiment will briefly be summarized.

(Parallel Transmission Method)

A configuration example of a mobile terminal 100 in which the parallel transmission method is adopted will be briefly described with reference to FIG. 1. FIG. 1 is an explanatory view showing a configuration example of the mobile terminal 100 in which the parallel transmission method is adopted. In FIG. 1, a mobile phone is schematically illustrated as an example of the mobile terminal 100. However, the scope of application of the technology described below is not limited to the mobile phone.

As shown in FIG. 1, the mobile terminal 100 mainly includes a display unit 102, a liquid crystal unit 104 (LCD), and a connection unit 106. Further, the mobile terminal 100 mainly includes an operation unit 108, a baseband processor 110 (BBP), and a parallel signal line 112. In the description that follows, the display unit 102 may be called a display side and the operation unit 108 a main body side. A case in which an image signal is transmitted from the main body side to the display side will be described. Naturally, the technology described below is not limited to such an example.

As shown in FIG. 1, the liquid crystal unit 104 is provided in the display unit 102. Then, an image signal transmitted via the parallel signal line 112 is displayed in the liquid crystal unit 104. The connection unit 106 is a member to connect the display unit 102 and the operation unit 108. The connecting member forming the connection unit 106 has, for example, a structure to allow the display unit 102 to rotate in a Z-Y plane up to 180 degrees. The connecting member also has a structure to allow the display unit 102 to be rotatably formed in an X-Z plane so that the mobile terminal 100 can be folded. Incidentally, a connecting member having a complex movable configuration so that the display unit 102 is directed in any direction may be used.

The baseband processor 110 is an arithmetic processing unit that provides communication control of the mobile terminal 100 and an execution function of applications. Parallel signals output from the baseband processor 110 are transmitted to the liquid crystal unit 104 of the display unit 102 through the parallel signal line 112. The parallel signal line 112 has a large number of signal lines wired therein. In the case of a mobile phone, for example, the number n of signal lines is about 50. The transmission speed of an image signal is about 130 Mbps when the resolution of the liquid crystal unit 104 is QVGA and one dot is drawn with 24 bits and 60 frames/s while the information speed is 110.6 Mbps for framing with additional information. The parallel signal line 112 is wired so as to pass through the connection unit 106.

That is, the connection unit 106 has a large number of signal lines forming the parallel signal line 112 wired therein. If the movable range of the connection unit 106 is extended as described above, the parallel signal line 112 may be damaged when the connection unit 106 is moved. Thus, reliability of the parallel signal line 112 will decrease. If, on the other hand, an attempt is made to maintain reliability of the parallel signal line 112, the movable range of the connection unit 106 will be significantly limited. For these reasons, the serial transmission method is frequently adopted for mobile phone and the like with the intention of making flexibility of the movable member forming the connection unit 106 consistent with reliability of the parallel signal line 112. Also from the viewpoint of electromagnetic noise (EMI), serialization of transmission lines has been promoted.

(Serial Transmission Method)

Figure 2:
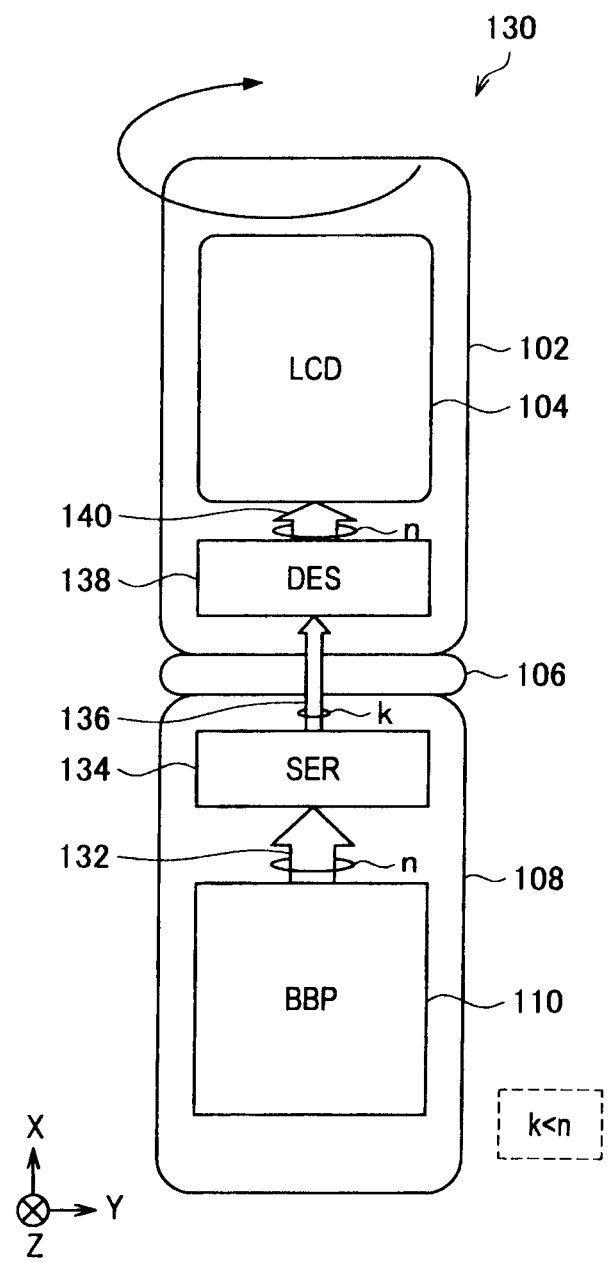
FIG. 2 shows a configuration example of a mobile terminal.

Thus, a configuration example of a mobile terminal 130 in which the serial transmission method is adopted will be briefly described with reference to FIG. 2. FIG. 2 is an explanatory view showing a configuration example of the mobile terminal 130 in which the serial transmission method is adopted. In FIG. 2, a mobile phone is schematically illustrated as an example of the mobile terminal 130. However, the scope of application of the technology described below is not limited to the mobile phone. The same reference numerals are attached to components having substantially the same function as those of the mobile terminal 100 in the parallel transmission method shown in FIG. 1 to omit a detailed description thereof.

As shown in FIG. 2, the mobile terminal 130 mainly includes the display unit 102, the liquid crystal unit 104 (LCD), the connection unit 106, and the operation unit 108. Further, the mobile terminal 130 includes the baseband processor 110 (BBP), parallel signal lines 132 and 140, a serializer 134, a serial signal line 136, and a deserializer 138.

In contrast to the mobile terminal 100, the mobile terminal 130 transmits an image signal and the like (serial signal) by the serial transmission method through the serial signal line 136 wired in the connection unit 106. Thus, the operation unit 108 is provided with the serializer 134 to serialize parallel signals output from the baseband processor 110. On the other hand, the display unit 102 is provided with the deserializer 138 to parallelize a serial signal transmitted through the serial signal line 136.

The serializer 134 converts parallel signals output from the baseband processor 110 and input via the parallel signal line 132 into a serial signal. The serial signal output from the serializer 134 is input into the deserializer 138 through the serial signal line 136. Then, the deserializer 138 restores the original parallel signals based on the input serial signal and inputs the parallel signals into the liquid crystal unit 104 through the parallel signal line 140.

A data signal encoded by, for example, the NRZ coding mode is alone transmitted or a data signal and a clock signal are together transmitted through the serial signal line 136. The number k of wires in the serial signal line 136 is significantly smaller than the number n of wires in the parallel signal line 112 in the mobile terminal 100 in FIG. 1 ($1 \leq k \ll n$). For example, the number k of wires can be reduced up to several wires.

Thus, flexibility of the movable range of the connection unit 106 in which the serial signal line 136 is wired can be considered to be extremely larger than that of the connection unit 106 in which the parallel signal line 112 is wired. Thus, reliability of the serial signal line 136 can be improved greatly by serializing the transmission line of signal. Incidentally, a differential signal such as an LVDS (Low Voltage Differential Signal) is used in most cases as a serial signal passing through the serial signal line 136.

(Function Configuration)

Figure 3:
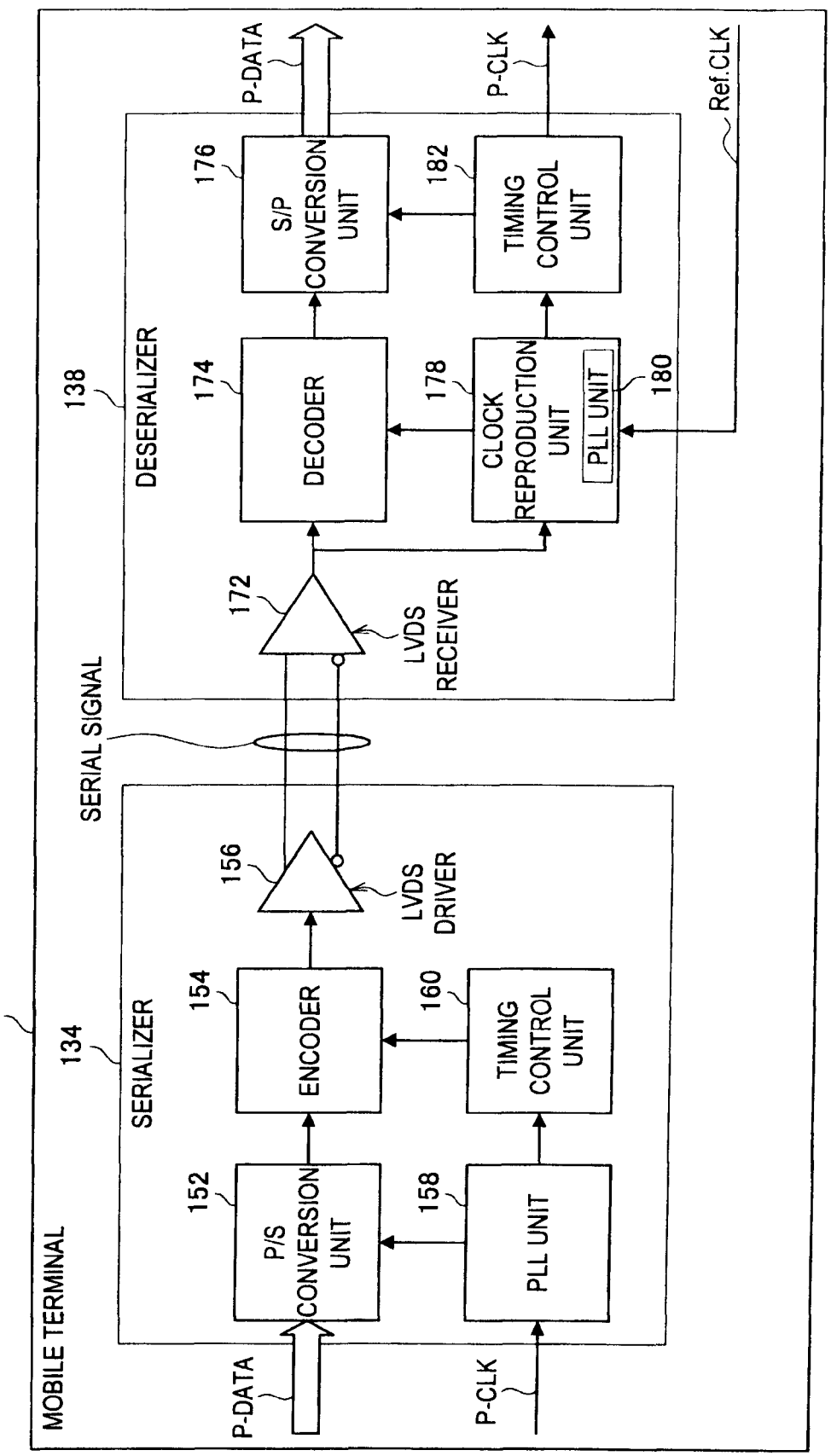
FIG. 3 shows a function configuration example of the mobile terminal according to serial transmission.

Here, the function configuration of the mobile terminal 130 in which the serial transmission method is adopted will be described with reference FIG. 3. FIG. 3 is an explanatory view showing a function configuration example of the mobile terminal 130 in which the serial transmission method is adopted. However, FIG. 3 is an explanatory view illustrated by focusing on the function configuration of the serializer 134 and the deserializer 138 and omits an illustration of other components.

(Serializer 134)

As shown in FIG. 3, the serializer 134 includes a P/S conversion unit 152, an encoder 154, an LVDS driver 156, a PLL unit 158, and a timing control unit 160.

First, parallel signals (P-DATA) and a clock for parallel signals (P-CLK) are input from the baseband processor 110 into the serializer 134. The parallel signals input into the serializer 134 are converted into a serial signal by the P/S conversion unit 152. The serial signal converted by the P/S conversion unit 152 is input into the encoder 154. The encoder 154 adds a header and the like to the serial signal and inputs the serial signal into the LVDS driver 156. The LVDS driver 156 transmits the input serial signal to the deserializer 138 by a differential transmission method using the LVDS.

The clock for parallel signals input into the serializer 134 is input into the PLL unit 158. The PLL unit 158 generates a clock for serial signal from the clock for parallel signals and inputs the clock for serial signal into the P/S conversion unit 152 and the timing control unit 160. The timing control unit 160 controls transmission timing of a serial signal by the encoder 154 based on the input signal for serial signal.

(Deserializer 138)

The deserializer 138 mainly includes the LVDS receiver 172, the decoder 174, the S/P conversion unit 176, the clock reproduction unit 178, the PLL unit 180, and the timing control unit 182.

A serial signal is transmitted to the deserializer 138 from the serializer 134 by the differential transmission method using the LVDS. The serial signal is received by the LVDS receiver 172. The serial signal received by the LVDS receiver 172 is input into the decoder 174 and the clock reproduction unit 178. The decoder 174 detects a starting portion of data by referencing the header of the input serial signal and inputs the serial signal into the S/P conversion unit 176. The S/P conversion unit 176 converts the input serial signal into parallel signals (P-DATA). The parallel signals converted by the S/P conversion unit 176 are output to the liquid crystal unit 104.

On the other hand, the clock reproduction unit 178 references a reference clock input from outside and uses the built-in PLL unit 180 to reproduce a clock for parallel signals from a clock for serial signal. The clock for parallel signals reproduced by the clock reproduction unit 178 is input into the decoder 174 and the timing control unit 182. The timing control unit 182 controls reception timing based on the clock for parallel signals input from the clock reproduction unit 178. The clock for parallel signals (P-CLK) input into the timing control unit 182 is output to the liquid crystal unit 104.

Thus, parallel signals (P-DATA) and a clock for parallel signals (P-CLK) input from the baseband processor 110 into the serializer 134 are transmitted to the deserializer 138 after being converted into a serial signal. Then, the input serial signal is restored to the original parallel signals and clock for parallel signals by the deserializer 138 before being output to the liquid crystal unit 104.

By converting parallel signals into a serial signal for transmission like the mobile terminal 130 described above, the transmission line thereof is serialized. As a result, the movable range of a portion where the serial signal line is arranged is extended, enhancing flexibility of regarding the arrangement of the display unit 102. Thus, when, for example, TV broadcasting is viewed using the mobile terminal 130, the mobile terminal 130 can be deformed so that the arrangement of the display unit 102 looks long sideways. With such enhanced flexibility, uses of the mobile terminal 130 are increased so that, in addition to various functions as a communication terminal, various uses such as viewing of images or music are being devised.

(Application Example: Data Transmission Method Using a Power Line)

Incidentally, the encoder 154 of the mobile terminal 130 may be configured to encode input data based on the Manchester coding mode that does not contain any DC component. In this case, an encoded signal contains no DC component and thus can be transmitted by being superimposed on a power supply. The configuration of a mobile terminal 230 obtained by applying the mobile terminal 130 to a power line transmission method will be described.

(Function Configuration)

Figure 4:
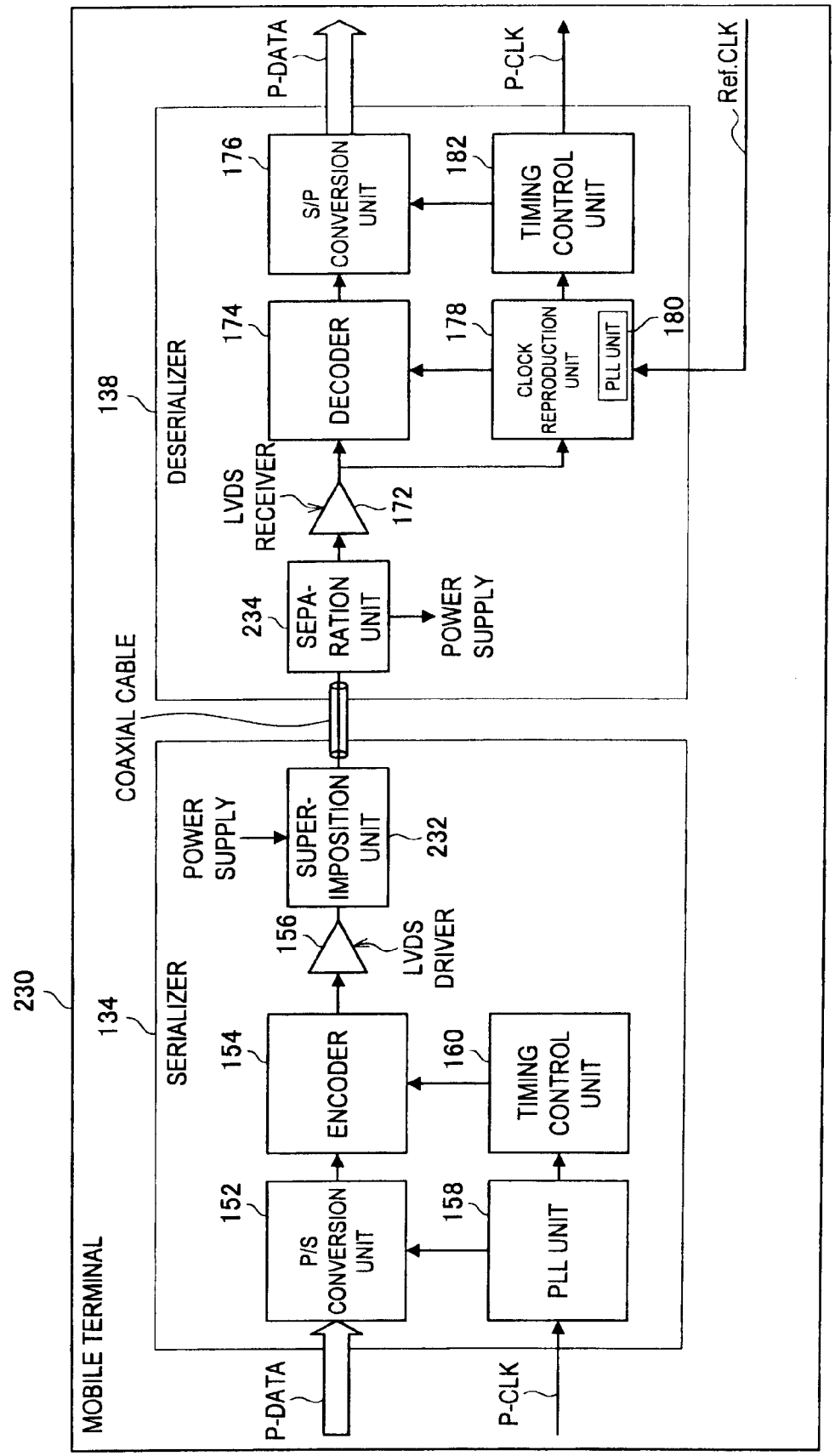
FIG. 4 shows a function configuration example of the mobile terminal according to serial transmission.

First, the function configuration of the mobile terminal 230 capable of transmitting data using a power line will be described with reference to FIG. 4. FIG. 4 is an explanatory view exemplifying the function configuration of the mobile terminal 230 capable of transmitting data using a power line. However, FIG. 4 is an explanatory view drawn by focusing on the function configuration of the serializer 134 and the deserializer 138 and other components are omitted. The same reference numerals are attached to, among components of the mobile terminal 230, components having substantially the same function as those of the mobile terminal 130 and a detailed description thereof is omitted.

(Serializer 134)

The serializer 134 includes the P/S conversion unit 152, the encoder 154, the LVDS driver 156, the PLL unit 158, and the timing control unit 160.

Parallel signals (P-DATA) and a clock for parallel signals (P-CLK) are input from the baseband processor 110 into the serializer 134. The parallel signals input into the serializer 134 are converted into a serial signal by the P/S conversion unit 152. The serial signal converted by the P/S conversion unit 152 is input into the encoder 154. The encoder 154 adds a header and the like to the serial signal and encodes the serial signal by a method such as the Manchester coding mode that has no DC component (or a small amount of DC component). The signal output from the encoder 154 is input into the LVDS driver 156.

The LVDS driver 156 converts the input serial signal into an LVDS, which is input into a superimposing unit 232. The superimposing unit 232 transmits the signal input from the LVDS driver 156 to the deserializer 138 by superimposing the signal on a power line. For example, the superimposing unit 232 couples the signal by a capacitor and a power supply by a choke coil. Then, the signal superimposed on the power supply by the superimposing unit 232 is input into the deserializer 138 through the power line. The power line is a line provided to supply power from the operation unit 108 to the display unit 102. For example, a coaxial cable is used as a transmission line for the power line.

The clock for parallel signals input into the serializer 134 is input into the PLL unit 158. The PLL unit 158 generates a clock for serial signal from the clock for parallel signals and inputs the clock for serial signal into the P/S conversion unit 152 and the timing control unit 160. The timing control unit 160 controls transmission timing of a serial signal by the encoder 154 based on the input clock for serial signal.

(Deserializer 138)

The deserializer 138 mainly includes the LVDS receiver 172, the decoder 174, the S/P conversion unit 176, the clock reproduction unit 178, the PLL unit 180, the timing control unit 182, and a separation unit 234.

Figure 5:
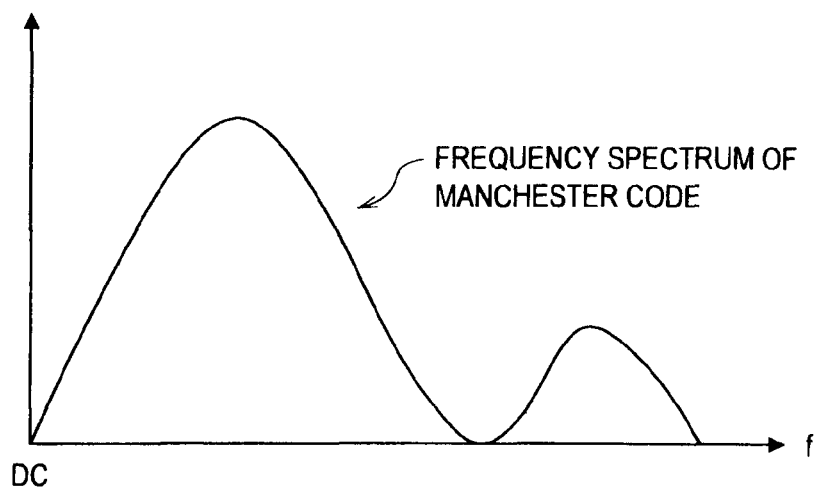
FIG. 5 exemplifies a frequency spectrum of a Manchester code.

A signal obtained by superimposing a serial signal on a power supply is input into the deserializer 138 through the power line (coaxial cable). The frequency spectrum of the superimposed signal is as shown in FIG. 5. As shown in FIG. 5, the frequency spectrum of a Manchester code has no DC component. Thus, it is clear from FIG. 5 that a transmission signal (encoded signal) of data encoded in the Manchester coding mode can be transmitted together with a power supply (DC).

FIG. 4 will be referenced again. The superimposed signal is separated into a serial signal and a power supply by the separation unit 234. For example, the separation unit 234 extracts a serial signal by cutting off a DC component using a capacitor and a power supply by cutting off high-frequency components using a choke coil. The serial signal separated by the separation unit 234 is received by the LVDS receiver 172.

The serial signal received by the LVDS receiver 172 is input into the decoder 174 and the clock reproduction unit 178. The decoder 174 detects a starting portion of data by referencing the header of the input serial signal, decodes the serial signal encoded in the Manchester coding mode, and inputs the decoded serial signal into the S/P conversion unit 176. The S/P conversion unit 176 converts the input serial signal into parallel signals (P-DATA). The parallel signals converted by the S/P conversion unit 176 are output to the liquid crystal unit 104.

On the other hand, the clock reproduction unit 178 references a reference clock input from outside and uses the built-in PLL unit 180 to reproduce a clock for parallel signals from a clock for serial signal. The clock for parallel signals reproduced by the clock reproduction unit 178 is input into the decoder 174 and the timing control unit 182. The timing control unit 182 controls reception timing based on the clock for parallel signals input from the clock reproduction unit 178. The clock for parallel signals (P-CLK) input into the timing control unit 182 is output to the liquid crystal unit 104.

Thus, the mobile terminal 230 can transmit a power supply and a serial signal (such as an image signal) by one coaxial cable. Thus, only one wire connects the operation unit 108 and the display unit 102 so that mobility of the display unit 102 can be improved and the mobile terminal 230 can be deformed into a complex shape. As a result, more uses of the mobile terminal 230 can be found and user convenience is improved.

(Summary 1 of Issues)

As described above, in order to freely change the relative spatial relationship between the operation unit 108 and the display unit 102, the parallel transmission method is inconvenient like the case of the mobile terminal 100 described above. Thus, like the above mobile terminal 130, serial transmission of an image signal or the like is enabled by providing the serializer 134 and the deserializer 138 to increase the movable range of the display unit 102. Further, mobility of the display unit 102 is further improved by using a method of transmission by which a signal is superimposed on a power line for transmission by making use of characteristics of the coding mode used by the mobile terminal 130.

However, as shown in FIG. 3 and FIG. 4, the mobile terminals 130 and 230 are provided with the PLL unit 180 (hereinafter, PLL) to reproduce a clock of a received serial signal. It is necessary to have the PLL to extract a clock from a signal encoded in the Manchester coding mode or the like. However, power consumption by the PLL itself is not low. Thus, providing the PLL increases power consumption of the mobile terminals 130 and 230 accordingly. Such an increase in power consumption poses a very serious issue for a small apparatus such as a mobile phone.

Regarding the above technical issue, a method of eliminating the need for PLL in the deserializer 138 is demanded. In response to such a demand, a new signal transmission method that transmits a signal by using a "code that does not contain any DC component and needs no PLL during clock reproduction" was recently developed. The technology according to an embodiment of the present invention described below is a technology based on this new signal transmission method. Thus, the new signal transmission method will be described here. In the description that follows, the new signal transmission method may be called the new mode.

<Basic Technology: New Mode>

The new signal transmission method (new mode) that transmits a signal by using a code that does not contain any DC component and capable of reproducing a clock without using PLL will be described below. First, characteristics of an AMI (Alternate Mark Inversion) code forming the foundation for describing the encoding method in the new mode will be briefly described. Then, the function configuration of a mobile terminal 300 according to the new mode and an encoding/decoding method according to the new mode will be described.

(Signal Waveform of AMI Code)

Figure 6:
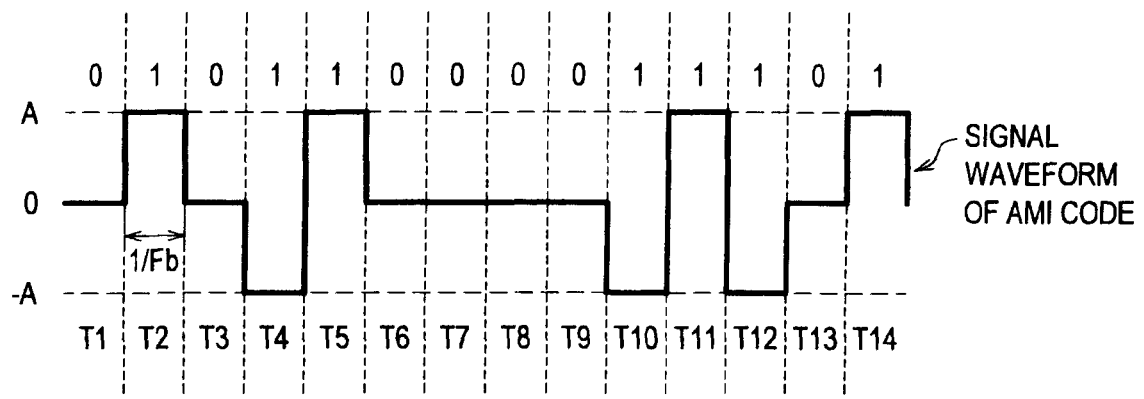
FIG. 6 exemplifies a signal waveform of an AMI code.

First, a signal waveform of AMI code and characteristics thereof will be described with reference to FIG. 6. FIG. 6 is an explanatory view exemplifying a signal waveform of an AMI code. In the description that follows, A is assumed to be any positive number.

The AMI code is a code that represents data 0 as the potential 0 and data 1 as the potential A or −A. The potential A and the potential −A are alternately repeated. That is, if data 1 appears after data 1 is represented by the potential A, the data 1 is represented by the potential −A. Since data is represented by repeating polarity reversal in this manner, the AMI code does not contain any DC component.

As a code having characteristics similar to those of the AMI code, for example, a code in partial response mode represented like PR (1, −1), PR (1, 0, −1), PR (1, 0, . . . , −1) and the like is known. Such a transmission code using polarity reversal is called a bipolar code. Such a bipolar code can be used in a signal transmission method according to the new mode. Further, a code in decode mode may be applied in a signal transmission method according to the new mode. Here, for convenience of description, an example of AMI code with 100% duty will be taken for the description below.

FIG. 6 schematically shows an AMI code of bit intervals T1, T2, . . . , T14. In FIG. 6, data 1 appears in bit intervals T2, T4, T5, T10, T11, T12, and T14. If the potential in the bit interval T2 is A, the potential in the bit interval T4 becomes −A. Furthermore, the potential in the bit interval T5 becomes A. Thus, the amplitude corresponding to data 1 is alternately reversed to the positive and negative potentials. This is the polarity reversal described above.

On the other hand, data 0 is all represented by the potential 0. Using representations described above, the AMI code does not contain any DC component, but as observed in the bit intervals T6, . . . , T9, the potential 0 may appear consecutively. If the potential 0 continues like this, it is very difficult to extract a clock component from a signal waveform without using any PLL on the receiving side. Therefore, according to the new mode, a technology to cause an AMI code (and any code having characteristics equivalent thereto) to include a clock component for transmission is used. The technology will be described below.

(Function Configuration)

Figure 7:
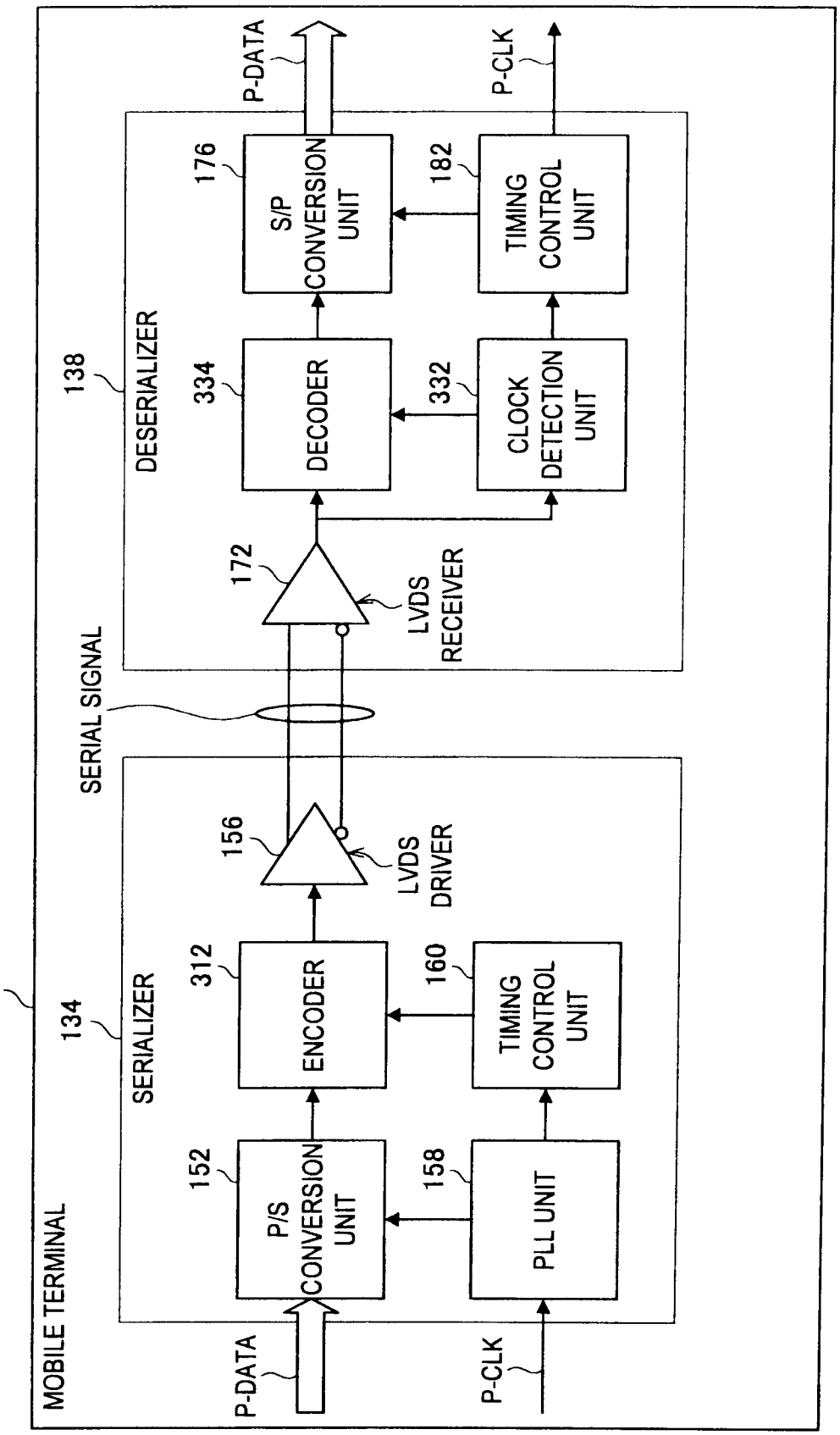
FIG. 7 shows a function configuration example of the mobile terminal according to a new mode.

Next, the function configuration of the mobile terminal 300 according to the new mode will be described with reference to FIG. 7. FIG. 7 is an explanatory view illustrating a function configuration example of the mobile terminal 300 according to the new mode. However, FIG. 7 is an explanatory view drawn by focusing on the function configuration of the serializer 134 and the deserializer 138 and other components are omitted. The same reference numerals are attached to, among components of the mobile terminal 300, components having substantially the same function as those of the mobile terminal 130 described above and a detailed description thereof is omitted.

(Serializer 134)

The serializer 134 includes the P/S conversion unit 152, the LVDS driver 156, the PLL unit 158, the timing control unit 160, and an encoder 312. A main difference from the mobile terminal 130 described above is the function held by the encoder 312.

First, parallel signals (P-DATA) and a clock for parallel signals (P-CLK) are input from the baseband processor 110 into the serializer 134. The parallel signals input into the serializer 134 are converted into a serial signal by the P/S conversion unit 152. The serial signal converted by the P/S conversion unit 152 is input into the encoder 312. The encoder 312 adds a header and the like to the serial signal and encodes the serial signal based on the predetermined coding mode (new mode) to generate an encoded signal.

Figure 8:
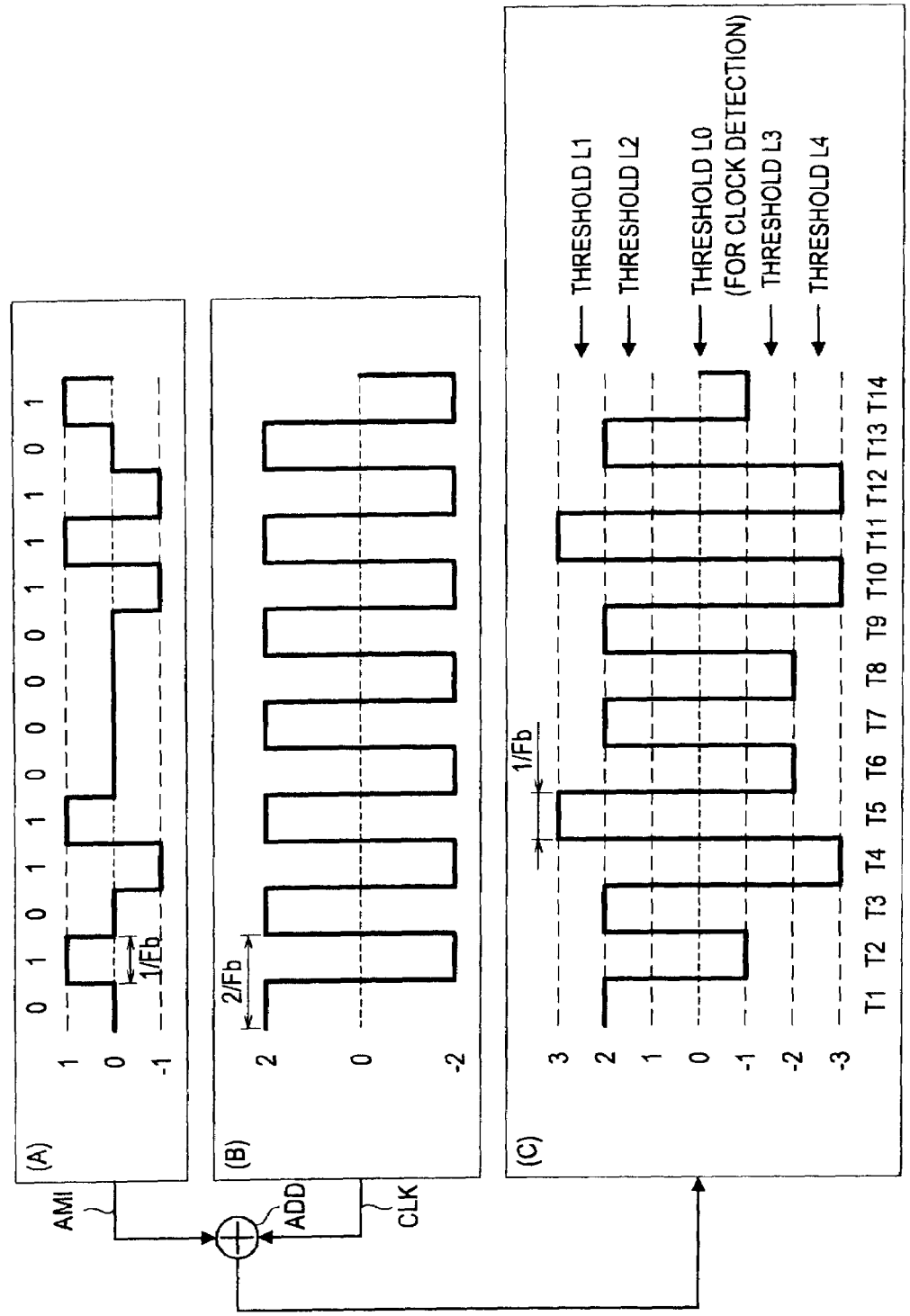
FIG. 8 shows a signal generation method according to the new mode.

Here, the encoding method in the new mode by the encoder 312 will be described with reference to FIG. 8. FIG. 8 is an explanatory view exemplifying the encoding method according to the new mode. FIG. 8 shows a generation method of a code based on the AMI code. However, the technology according to the new mode is not limited to this and is applied to any code having characteristics similar to those of the AMI code in the same manner. The technology is applicable to, for example, a bipolar code and a code in partial response mode.

The signal illustrated in (A) is obtained by encoding input data based on the AMI coding mode. On the other hand, the signal illustrated in (C) is a signal encoded by the encoding method of the new mode based on the signal in (A). In this signal, data 1 is represented by a plurality of potentials A1 (−1, −3, 1, 3) and data 0 is represented by a plurality of potentials A2 (−2, 2) that are different from the potentials A1. The signal is formed to reverse its polarity in each period and not to take the same potential consecutively.

For example, a section in which data 0 continues is present in the bit intervals T6 to T9 in (A) and is represented as a consecutive section of the potential 0, but in (C), the potential changes like −2, 2, −2, 2 in the same section. Thus, the signal in (C) is formed in such a way that, even if the same data value appears consecutively, the polarity thereof is reversed in each period. Thus, if the signal in (C) is used for data transmission, a clock component can be reproduced by detecting both rising and falling edges on the receiving side. The method of generating the signal in (C) according to the new mode will be described below.

The encoder 312 is provided with an adder ADD to generate a code such as the above code shown in (C). For example, the encoder 312 inputs an input serial signal into the adder ADD after the serial signal being encoded into an AMI code (A). Further, the encoder 312 generates a clock (B) having a frequency (Fb/2) that is half that of an AMI code having a transmission speed Fb and inputs the clock (B) into the adder ADD. The amplitude of the clock is assumed to be N times (N>1; N=2 in the example in FIG. 8) that of the AMI code. Then, the encoder 312 generates a code (C) by adding the AMI code and the clock using the adder ADD. At this point, the AMI code and the clock are synchronized and edges thereof are aligned before being added.

FIG. 7 will be referenced again. The serial signal encoded by the encoder 312 is input into the LVDS driver 156. The LVDS driver 156 transmits the input serial signal to the deserializer 138 by the differential transmission method using the LVDS. Incidentally, the clock for parallel signals input into the serializer 134 is input into the PLL unit 158. The PLL unit 158 generates a clock for serial signal from the clock for parallel signals and inputs the clock for serial signal into the P/S conversion unit 152 and the timing control unit 160. The timing control unit 160 controls transmission timing of the serial signal by the encoder 312 based on the input clock for serial signal.

(Deserializer 138)

The deserializer 138 mainly includes the LVDS receiver 172, the S/P conversion unit 176, the timing control unit 182, a clock detection unit 332, and a decoder 334. A main difference from the mobile terminal 130 described above is the function of the clock detection unit 332 having no PLL.

A serial signal is transmitted to the deserializer 138 from the serializer 134 by the differential transmission method using the LVDS. The serial signal is received by the LVDS receiver 172. The serial signal received by the LVDS receiver 172 is input into the decoder 334 and the clock detection unit 332. The decoder 334 detects a starting portion of data by referencing the header of the input serial signal and decodes the serial signal encoded by the coding mode used by the encoder 312.

Here, the decoding method by the decoder 334 will be briefly described with reference to FIG. 8. A detailed circuit configuration of the decider 334 will be described below. As described above, the serial signal is encoded into the format shown in (C) by the encoder 312. Thus, the serial signal can be decoded into the original serial signal by the decoder 334 by determining whether the amplitude of the received signal is A1 or A2. Four thresholds (L1, L2, L3, and L4) shown in FIG. 8 are used to determine the amplitude A1 (−1, −3, 1, 3) corresponding to data 1 and the amplitude A2 (−2, 2) corresponding to data 0. Thus, the decoder 334 compares the amplitude of the input signal and the above four thresholds to determine whether the amplitude is A1 or A2 to decode the serial signal into the original serial signal.

FIG. 7 will be referenced again. The serial signal decoded by the decoder 334 is input into the S/P conversion unit 176. The S/P conversion unit 176 converts the input serial signal into parallel signals (P-DATA). The parallel signals converted by the S/P conversion unit 176 are output to the liquid crystal unit 104.

On the other hand, the clock detection unit 332 detects a clock component from the signal received by the LVDS receiver 172. At this point, the clock detection unit 332 detects the period of the polarity reversal by comparing the amplitude value of the signal and the threshold L0 (potential 0) and reproduces the original clock by detecting a clock component based on the period. Thus, the clock detection unit 332 does not use any PLL when detecting a clock component from a signal. Therefore, there is no need to provide a PLL on the side of the deserializer 138 and power consumption of the deserializer 138 can be reduced.

The clock reproduced by the clock detection unit 332 is input into the decoder 334 and the timing control unit 182. The timing control unit 182 controls reception timing based on the clock input from the clock detection unit 332. The clock (P-CLK) input into the timing control unit 182 is output to the liquid crystal unit 104.

Thus, by using a code that does not contain any DC component (see FIG. 9) and capable of detecting a clock component from the polarity reversal period, the need for PLL to reproduce a clock is eliminated and therefore, power consumption of a mobile terminal can significantly be reduced.

Figure 9:
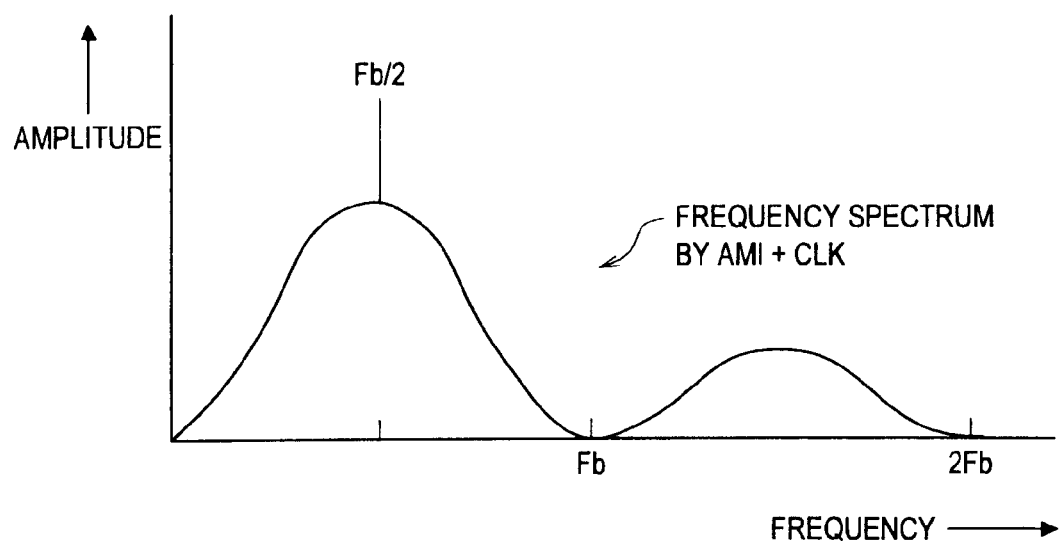
FIG. 9 exemplifies the frequency spectrum of a signal according to the new mode.

The frequency spectrum of a code used in the new mode has a shape as shown, for example, in FIG. 9. A line spectrum appears at frequency Fb/2 of the clock added by the adder ADD of the encoder 312 and in addition, a broad frequency spectrum of the AMI code appears. The frequency spectrum has null points at frequencies Fb, 2Fb, 3Fb . . . .

(Summary 2 of Issues)

As described above, a clock component can be extracted from the received signal without providing any PLL on the receiving side by using the signal transmission method according to the new mode. Since no DC component is contained in an encoded signal, the encoded signal can be transmitted through a power line by superimposing the encoded signal on a DC current. However, technology according to the new mode has been developed by being aware of application to an AMI code, a code in partial response mode, and the like. Thus, in order to transmit additional data separately from a main sequence of data, it becomes necessary to form and add a data frame for additional data. Therefore, in an embodiment of the present embodiment described below, a technology to transmit additional data within the framework of the new mode of a data frame to transmit a main sequence of data without losing advantages of the new mode will be proposed.

[CMI Code]

The technology according to an embodiment of the present invention described below is based on the CMI coding mode. Thus, before describing the embodiment in detail, coding rules for a CMI code and the coding method will be briefly described with reference to FIG. 10 to FIG. 12. FIG. 10 is an explanatory view illustrating the generation method of a CMI code. FIG. 11 is an explanatory view showing coding rules for a CMI code. FIG. 12 is an explanatory view showing the flow of coding processing of a CMI code.

First, FIG. 10 will be referenced. In FIG. 10, input data represented by an NRZ code (an H level is data 1 and an L level is data 0) and a CMI code corresponding to the input data are shown. The CMI coding mode represents 1-bit data by 2-bit data. Coding rules for a CMI code are shown in FIG. 11. As shown in FIG. 11, data "0" of the NRZ code is represented by data "01" of the CMI code.

Data "1" of the NRZ code is represented by data "00" or "11" of the CMI code. For example, when data "1" of the NRZ code is input, if the CMI code corresponding to data "1" of the NRZ code input last time is data "00", data of the CMI code this time is represented by "11". Conversely, if the CMI code corresponding to data "1" of the NRZ code input last time is data "11", data of the CMI code this time is represented by "00".

Figures 11, 12:
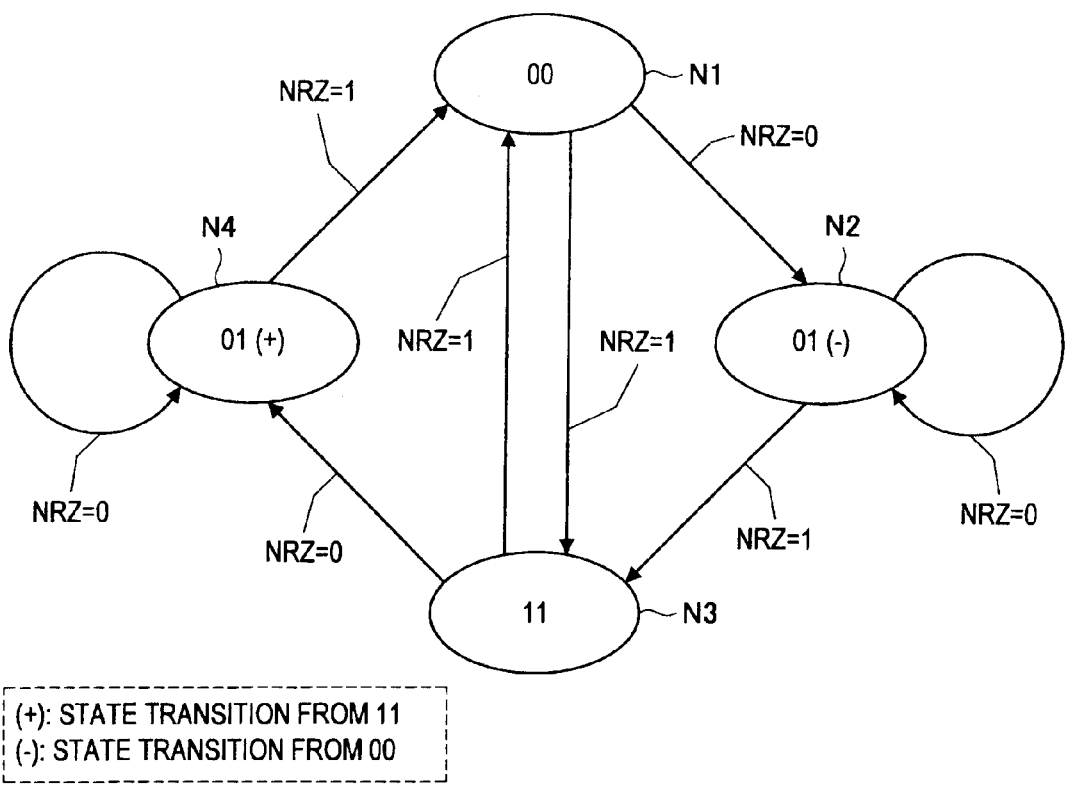
FIG. 11 shows coding rules for a CMI code.
FIG. 12 shows coding rules for a CMI code.

FIG. 10 will be referenced again by keeping the CMI coding rules shown in FIG. 11 in mind. FIG. 10 shows an example in which data (1, 0, 1, 0, 1, 1, 0, 0, 1) of the NRZ code is converted into data of the CMI code.

Data "1" of the NRZ code in the first position is converted into data "11" of the CMI code according to the above CMI coding rules. It is assumed, however, that data of the CMI code corresponding to data "1" of the NRZ code input last time is "00". Next, data "0" of the NRZ code in the second position is converted into data "01" of the CMI code according to the above CMI coding rules. Next, data "1" of the NRZ code in the third position is converted into data "00" of the CMI code. Similarly, data "0", "1", "1", "0", "0", and "1" of the NRZ code in the fourth to the ninth positions is converted into data "01", "11", "00", "01", "01", and "11" of the CMI code respectively.

As described above, the CMI coding rules are formulated in such a way that when data "1" of the NRZ code is input many times, data of different CMI codes is allocated so that data of the same CMI code should not appear successively. Conversely, data "00" and "11" of the CMI code can be considered to represent data "1" of the same NRZ code with only different states of the CMI code. Thus, in the description that follows, data "00", "11", and "01" of the CMI code may be called "states". Transition rules between states can be summarized as shown in FIG. 12 from the CMI rules shown in FIG. 11.

FIG. 12 shows four states (N1, N2, N3, and N4) and transition directions between states. The state N1 corresponds to data "00" of the CMI code. The state N2 corresponds to data "01" (however, a transition from the state "00") of the CMI code. The state N3 corresponds to data "11" of the CMI code. The state N4 corresponds to data "01" (however, a transition from the state "11") of the CMI code. In FIG. 12, the symbol (+) indicates a transition from the state "11". Similarly, the symbol (−) indicates a transition from the state "00".

Transitions starting from the state N1 include a transition from the state N1 to the state N2 and that from the state N1 to the state N3. The transition from the state N1 to the state N2 occurs when data "0" (denoted as NRZ=0 in FIG. 12) of the NRZ code is input. That is, this transition means that the newly input data "0" of the NRZ code is converted into data "01" of the CMI code if data of the CMI code immediately before is "00". The transition from the state N1 to the state N3 occurs when data "1" (denoted as NRZ=1 in FIG. 12) of the NRZ code is input. That is, this transition means that the newly input data "1" of the NRZ code is converted into data "11" of the CMI code if data of the CMI code immediately before is "00".

Transitions starting from the state N2 include a transition from the state N2 to the state N3 and that from the state N2 back to the state N2. The transition from the state N2 to the state N3 occurs when data "1" (denoted as NRZ=1 in FIG. 12) of the NRZ code is input. That is, this transition means that the newly input data "1" of the NRZ code is converted into data "11" of the CMI code if data of the CMI code immediately before is "01". The transition from the state N2 back to the state N2 occurs when data "0" (denoted as NRZ=0 in FIG. 12) of the NRZ code is input. That is, this transition means that the newly input data "0" of the NRZ code is converted into data "01" of the CMI code if data of the CMI code immediately before is "01".

Transitions starting from the state N3 include a transition from the state N3 to the state N4 and that from the state N3 to the state N1. The transition from the state N3 to the state N4 occurs when data "0" (denoted as NRZ=0 in FIG. 12) of the NRZ code is input. That is, this transition means that the newly input data "0" of the NRZ code is converted into data "01" of the CMI code if data of the CMI code immediately before is "11". The transition from the state N3 to the state N1 occurs when data "1" (denoted as NRZ=1 in FIG. 12) of the NRZ code is input. That is, this transition means that the newly input data "1" of the NRZ code is converted into data "00" of the CMI code if data of the CMI code immediately before is "11".

Transitions starting from the state N4 include a transition from the state N4 to the state N1 and that from the state N4 back to the state N4. The transition from the state N4 to the state N1 occurs when data "1" (denoted as NRZ=1 in FIG. 12) of the NRZ code is input. That is, this transition means that the newly input data "1" of the NRZ code is converted into data "00" of the CMI code if data of the CMI code immediately before is "01". The transition from the state N4 back to the state N4 occurs when data "0" (denoted as NRZ=0 in FIG. 12) of the NRZ code is input. That is, this transition means that the newly input data "0" of the NRZ code is converted into data "01" of the CMI code if data of the CMI code immediately before is "01".

Thus, by using a state transition diagram as shown in FIG. 12, transitions between states are represented without omission by covering all CMI coding rules. That is, the coding method of the CMI code is executed based on the state transition diagram in FIG. 12. In the foregoing, coding rules and the coding method for the CMI code have been described. On the basis of the CMI coding rules described here, an embodiment of the present invention will be described.

<Embodiment>

An embodiment of the present invention will be described. The present embodiment is intended to reduce the number of times of threshold determination processing performed when bit values are decoded from a code that does not contain any DC component and needs no PLL circuit during clock reproduction. Particularly, the present embodiment is based on the technology according to the above new mode and concerns a technology that efficiently removes a clock signal on the receiving side.

[Function Configuration of a Mobile Terminal 400]

Figure 14:
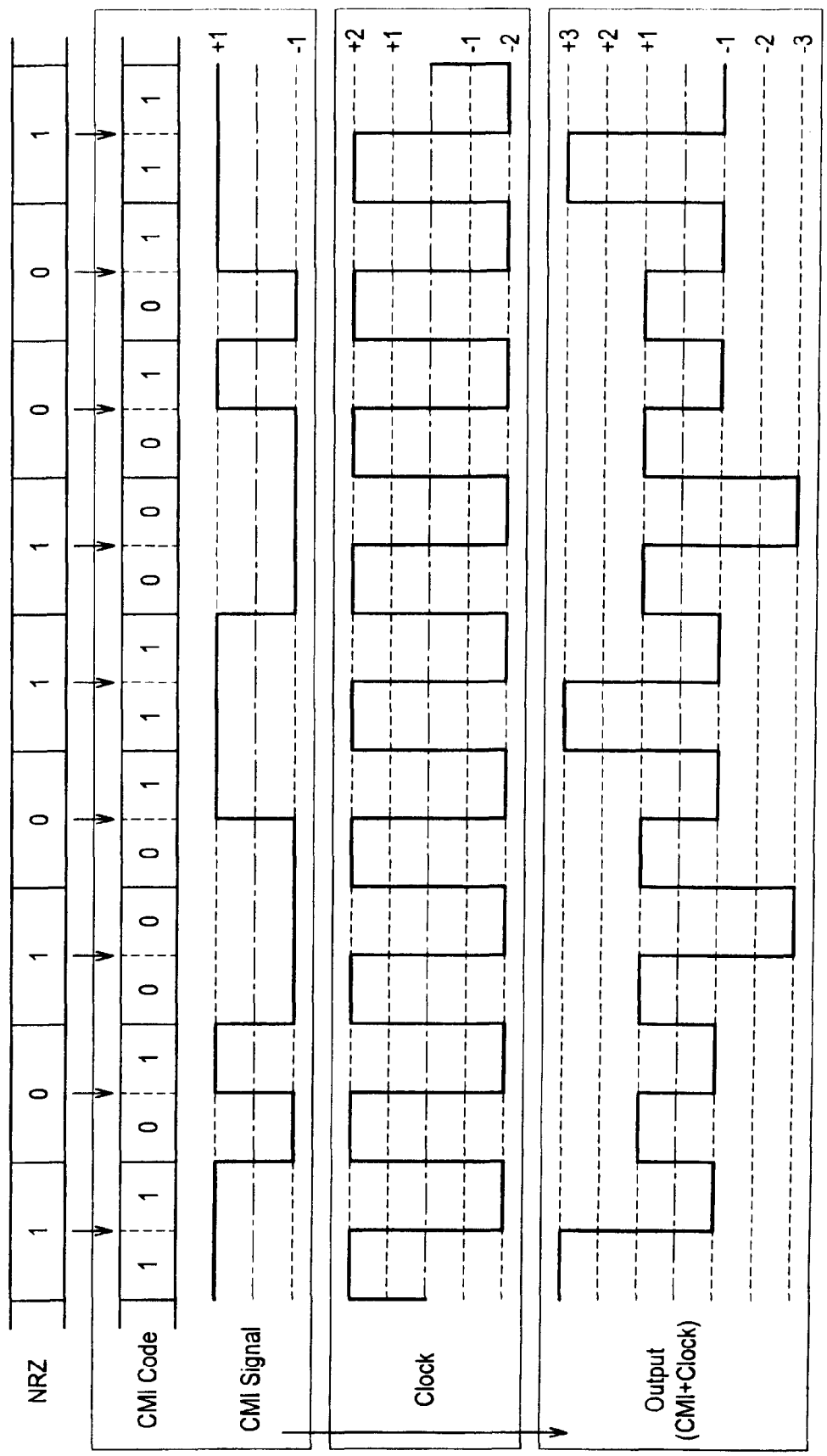
FIG. 14 shows a function configuration example of the mobile terminal according to an embodiment of the present invention.

First, the function configuration of the mobile terminal 400 according to the present embodiment will be described with reference to FIG. 14. FIG. 14 is an explanatory view illustrating a function configuration example of the mobile terminal 400 according to the present embodiment. However, FIG. 14 is an explanatory view drawn by focusing on the function configuration of the serializer 134 and the deserializer 138 and other components are omitted. The same reference numerals are attached to, among components of the mobile terminal 400, components having substantially the same function as those of the mobile terminal 300 described above and a detailed description thereof is omitted.

(Serializer 134)

The serializer 134 includes the P/S conversion unit 152, the driver 156, the PLL unit 158, the timing control unit 160, the superimposing unit 232, and the encoder 312. The serializer 134 in the mobile terminal 400 is substantially the same as that in the mobile terminal 300 except that the superimposing unit 232 is provided. The function configuration of the superimposing unit 232 is substantially the same as that provided in the mobile terminal 230.

First, parallel signals (P-DATA) and a clock for parallel signals (P-CLK) are input from the baseband processor 110 into the serializer 134. The parallel signals input into the serializer 134 are converted into a serial signal by the P/S conversion unit 152. The serial signal converted by the P/S conversion unit 152 is input into the encoder 402. The encoder 402 adds a header and the like to the serial signal and encodes the serial signal according to an encoding method in the present embodiment described below to generate an encoded signal.

The encoded signal generated by the encoder 402 is input into the driver 156. The driver 156 converts the input serial signal into an LVDS and then inputs the LVDS into the superimposing unit 232. The superimposing unit 232 transmits the signal input from the driver 156 to the deserializer 138 by superimposing the signal on a power line. For example, the superimposing unit 232 uses a capacitor to couple the signal and uses a choke coil to couple a power supply. Then, the signal superimposed on the power supply by the superimposing unit 232 is input into the deserializer 138 through the power line.

The clock for parallel signals input into the serializer 134 is input into the PLL unit 158. The PLL unit 158 generates a clock for serial signal from the clock for parallel signals and inputs the clock for serial signal into the P/S conversion unit 152 and the timing control unit 160. The timing control unit 160 controls transmission timing of the serial signal by the encoder 312 based on the input clock for serial signal.

(Deserializer 138)

The deserializer 138 mainly includes the separation unit 234, the receiver 172, the S/P conversion unit 176, the timing control unit 182, and a decoding processing unit 402. The decoding processing unit 402 includes a decoder 404 and a clock detection unit 406. Like the above mobile terminal 300, the clock detection unit 406 is not provided with any PLL. A main difference from the mobile terminal 300 lies in the function of the decoding processing unit 402.

First, a signal obtained by superimposing a serial signal on a power supply is input into the deserializer 138 through a power line (coaxial cable). The superimposed signal is separated into a serial signal and a power supply by the separation unit 234. For example, the separation unit 234 extracts a serial signal by cutting off a DC component using a capacitor and a power supply by cutting off high-frequency components using a choke coil. The serial signal separated by the separation unit 234 is received by the receiver 172.

The serial signal received by the receiver 172 is input into the decoder 404 and the clock detection unit 406 included in the decoding processing unit 402. The decoder 404 detects a starting portion of data by referencing the header of the input serial signal and decodes the serial signal encoded by the coding mode used by the encoder 312. The serial signal decoded by the decoder 404 is input into the S/P conversion unit 176. The S/P conversion unit 176 converts the input serial signal into parallel signals (P-DATA). The parallel signals converted by the S/P conversion unit 176 are output to the liquid crystal unit 104.

On the other hand, the clock detection unit 406 detects a clock component from the signal received by the receiver 172. At this point, the clock detection unit 406 detects the period of the polarity reversal by comparing the amplitude value of the signal and the threshold L0 (potential 0) and reproduces the original clock by detecting a clock component based on the period. Then, the clock reproduced by the clock detection unit 406 is input into the decoder 404 and the timing control unit 182. The timing control unit 182 controls reception timing based on the clock input from the clock detection unit 406. The clock (P-CLK) input into the timing control unit 182 is output to the liquid crystal unit 104.

In the foregoing, the overall function configuration of the mobile terminal 400 according to the present embodiment has been described. The present embodiment is characterized by the encoding processing method by the encoder 402 and the decoding processing method by the decoding processing unit 410. Thus, these methods will be described below in detail.

[Encoding Processing Method by the Encoder 402]

First, the encoding processing method by the encoder 402 of the mobile terminal 400 will be described with reference to FIG. 14. FIG. 14 is an explanatory view showing the encoding processing method by the encoder 402 and the flow of the encoding processing.

In FIG. 14, data in NRZ coding mode (NRZ), data in CMI coding mode (CMI Code), an encoded signal in CMI coding mode (CMI Signal), a clock signal (Clock), and an output signal (Output) of the encoder 402.

First, the encoder 402 converts data in NRZ coding mode (NRZ), which is input data, into data in CMI coding mode (CMI Code). At this point, the data in CMI coding mode (CMI Code) is generated based on the CMI coding rules shown in FIG. 11 and FIG. 12. The data in CMI coding mode (CMI Code) is represented by an encoded signal in CMI coding mode (CMI Signal) shown in FIG. 14.

However, an encoded signal (CMI Signal) generated by the encoder 402 is adjusted so that the central value of amplitude thereof becomes 0. In the example in FIG. 14, data (CMI Code) "1" corresponds to the amplitude "+1" of the encoded signal (CMI Signal) and data (CMI Code) "0" corresponds to the amplitude "−1" of the encoded signal (CMI Signal). Accordingly, the central value of amplitude of the encoded signal (CMI Signal) becomes 0. Thus, the encoded signal (CMI Signal) is a DC-free code.

After the encoded signal (CMI Signal) being generated, the encoder 402 adds the encoded signal (CMI Signal) and the clock signal (Clock) after frequencies thereof are synchronized. If the bit rate of the encoded signal (CMI Signal) is Fb, the frequency of the clock signal (Clock) is set to Fb/2. The amplitude of the clock signal (Clock) is set to an amplitude larger than that of the encoded signal (CMI Signal). In the example in FIG. 14, amplitudes of the encoded signal (CMI Signal) are set to "+1" and "−1" and those of the clock signal (Clock) to "+2" and "−2".

The encoded signal (CMI Signal) and the clock signal (Clock) are synchronously added as described above and an output signal (Output) is output from the encoder 402. The output signal (Output) may be referred to as a "transmission signal" below. In the transmission signal illustrated in FIG. 14, the CMI code "1" is represented by two amplitude values "+3" and "−1" and the CMI code "0" by two amplitude values "+1" and "−3". Also, the transmission signal reverses its polarity in each period (½ clock), does not take the same amplitude value consecutively, and contains no DC component. Thus, the transmission signal can be transmitted by being superimposed on a DC current.

In the foregoing, the encoding processing method by the encoder 402 has been described. As described above, the encoder 402 encodes input data according to the CMI coding rules to generate an encoded signal and generates a transmission signal by synchronously adding a clock signal to the encoded signal. The voltage is adjusted so that the central value of amplitude becomes 0 to make the encoded signal DC-free. A clock signal whose amplitude is larger than that of the encoded signal and whose polarity changes at a point of change of CMI encoded data is used as the clock signal. Whether rising timing or falling timing of a clock signal to set for a point of change of CMI encoded data can optionally be set. A transmission signal generated in this manner does not contain any DC component and contains a clock component. As a result, a clock component can be extracted on the receiving side without using any PLL and a transmission signal can be transmitted using a power line.

[Decoding Processing Method by the Decoding Processing Unit 410]

Figure 15:
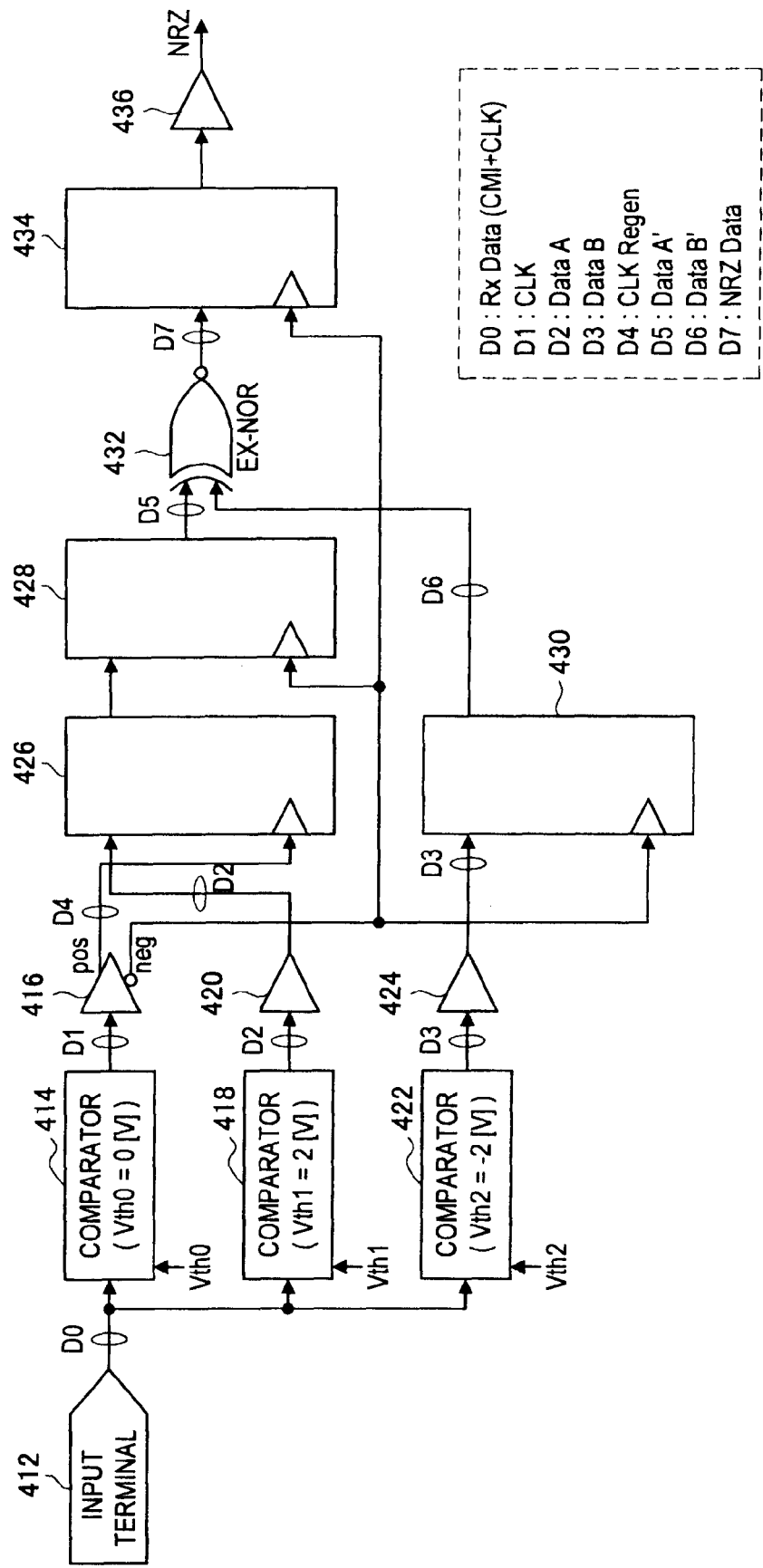
FIG. 15 shows a circuit configuration example of a signal processing unit according to the embodiment.
Figure 16:
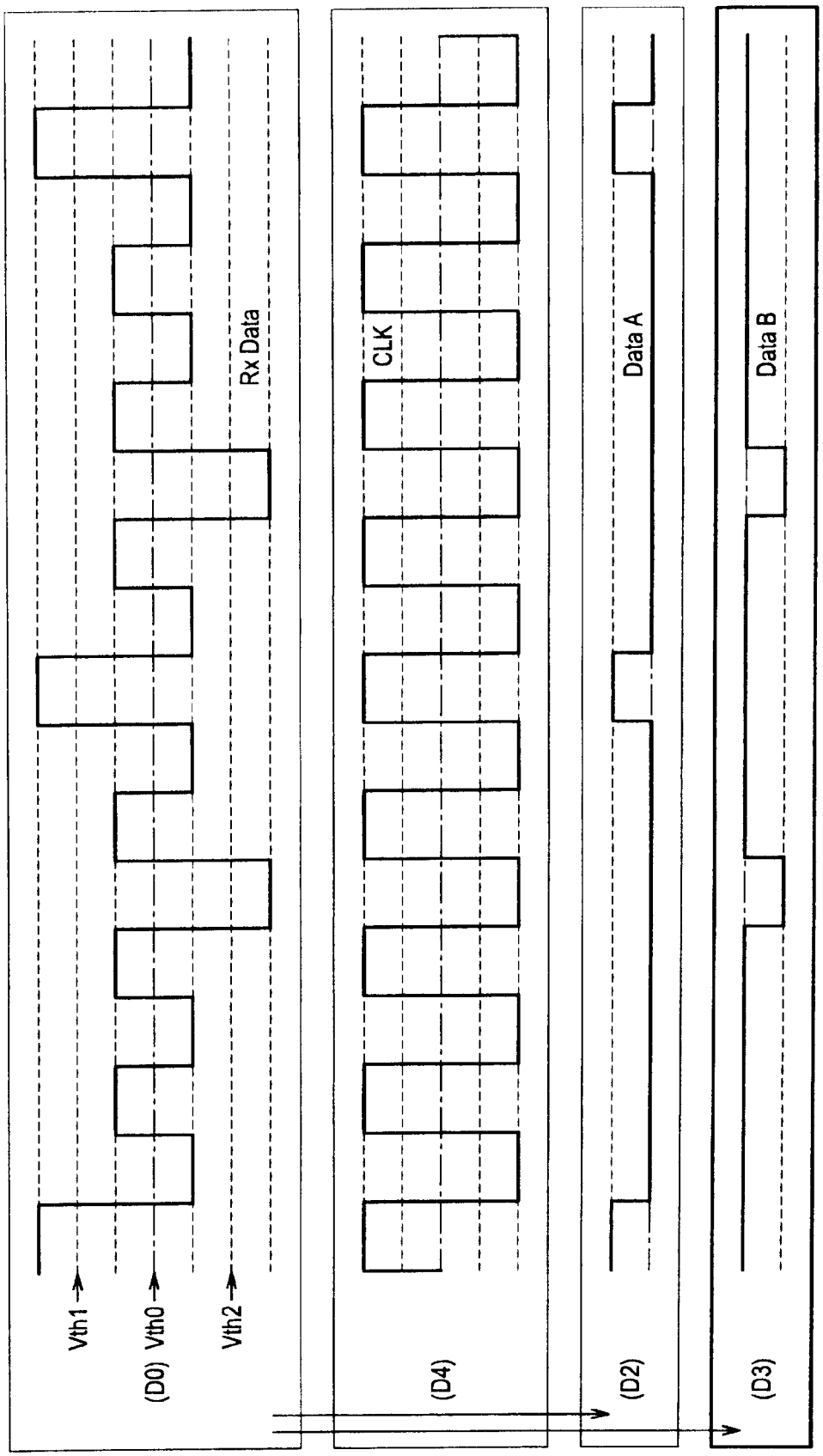
FIG. 16 shows the flow of decoding processing according to the present embodiment.
Figure 17:
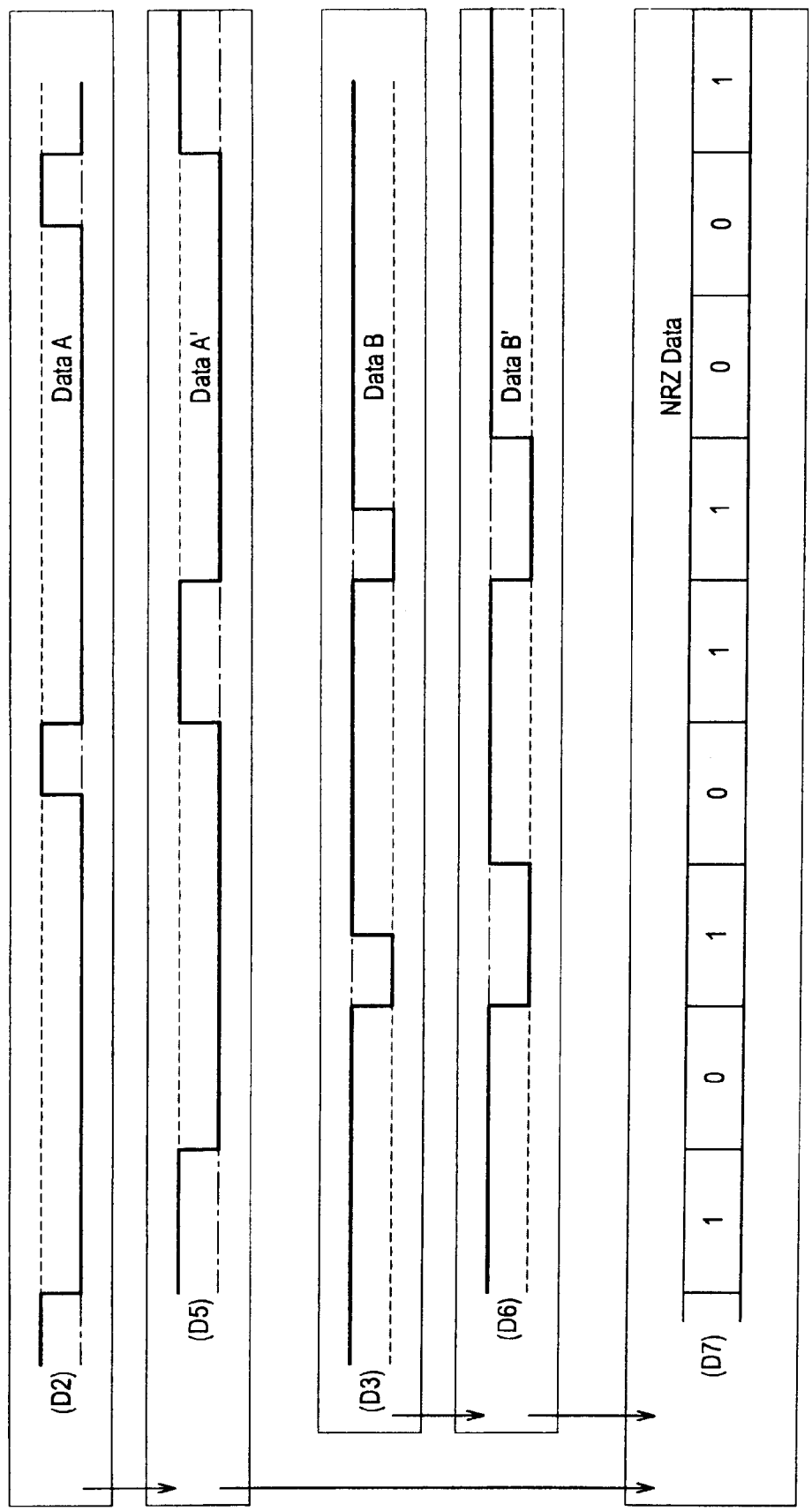
FIG. 17 exemplifies a signal processing method according to the embodiment.

Next, the decoding processing method by the decoding processing unit 410 of the mobile terminal 400 will be described with reference to FIG. 15 to FIG. 17. FIG. 15 is an explanatory view showing a circuit configuration example of the decoding processing unit 410. FIG. 16 and FIG. 17 are explanatory views showing the flow of decoding processing by the decoding processing unit 410.

(Circuit Configuration of the Decoding Processing Unit 410)

First, an example of the circuit configuration capable of realizing the function of the decoding processing unit 410 will be described with reference to FIG. 15.

As shown in FIG. 15, the decoding processing unit 410 includes an input terminal 412, comparators 414, 418, and 422, amplitude adjustment circuits 416, 420, 424, and 436, waveform shaping circuits 426, 428, 430, and 434, and an EX-NOR circuit 432. The waveform shaping circuits 426, 428, 430, and 434 are realized by, for example, a D-type flip-flop circuit.

Figure 13:
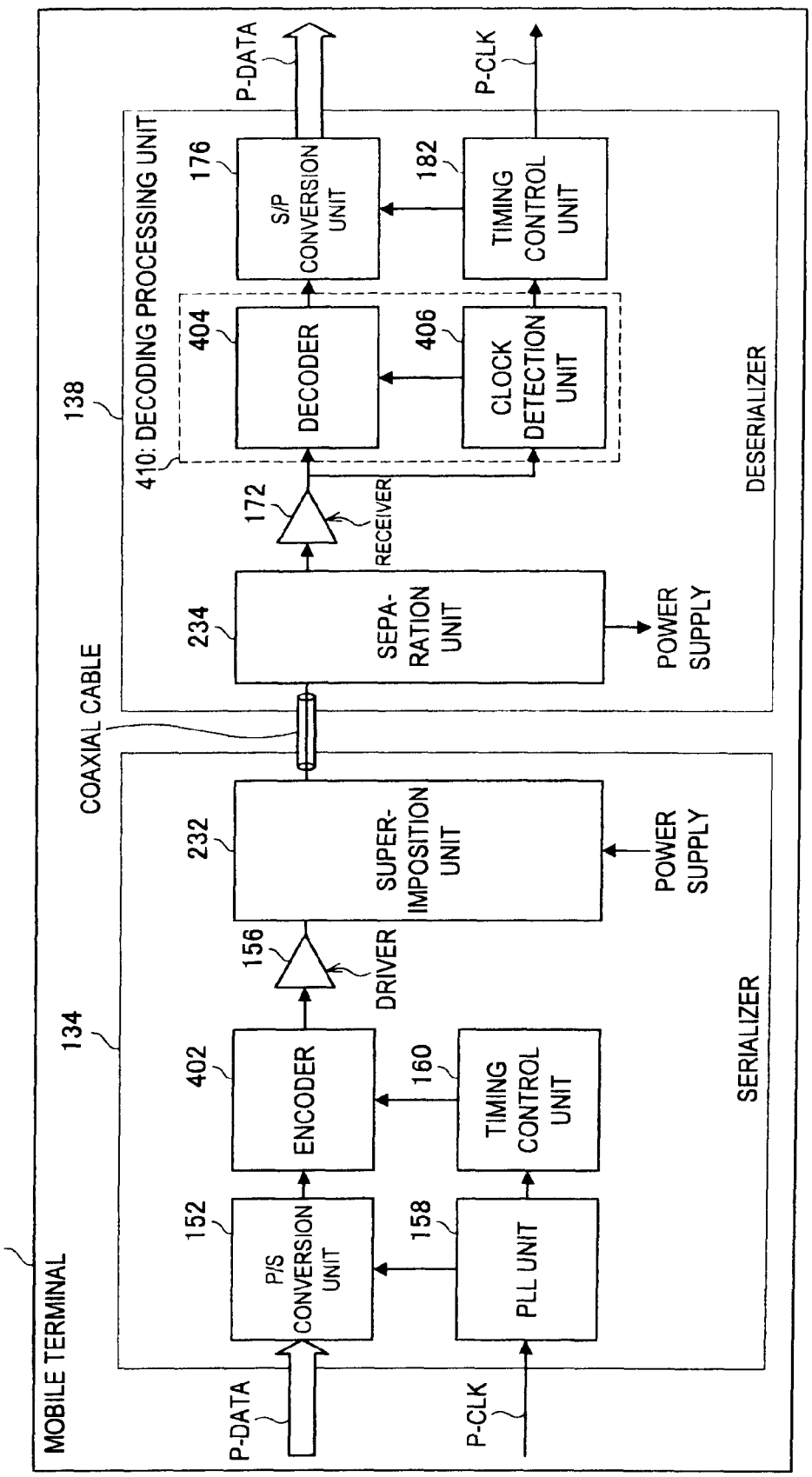
FIG. 13 shows the flow of encoding processing of the CMI code.

First, a received signal D0 (Rx Data) is input into the input terminal 412 from the receiver 172 (see FIG. 13). As described above, the received signal is a signal obtained by synchronously adding a clock signal (CLK) to an encoded signal (CMI) encoded in CMI coding mode. The received signal D0 input into the input terminal 412 is branched to be input into the comparators 414, 418, and 422 in parallel. A threshold potential Vth0 (Vth0=0) is set to the comparator 414. Also, a threshold potential Vth1 (Vth1=+2) is set to the comparator 418. Further, a threshold potential Vth2 (Vth2=−2) is set to the comparator 422.

When the received signal D0 is input into the comparator 414, an amplitude value L of the received signal D0 and the threshold potential Vth0 are compared. For example, if L≧Vth0, the comparator 414 outputs a determination value 1 and, if L<Vth0, a determination value 0. A determination result D1 (determination value 0/1) of the comparator 414 showing timing of polarity reversal is input into the amplitude adjustment circuit 416. Then, a clock signal (CLK) D4 synchronously added to the received signal D0 is reproduced by the amplitude adjustment circuit 416. The clock signal (CLK) D4 generated by the amplitude adjustment circuit 416 is input into the waveform shaping circuit 426. Further, the clock signal D4 generated by the amplitude adjustment circuit 416 is reversed before being input into the waveform shaping circuits 428, 430, and 434.

On the other hand, when the received signal D0 is input into the comparator 418, the amplitude value L of the received signal D0 and the threshold potential Vth1 are compared. For example, if L≧Vth1, the comparator 418 outputs the determination value 1 and, if L<Vth1, the determination value 0. Then, data D2 (determination value 0/1) output from the comparator 418 is input into the amplitude adjustment circuit 420. The data D2 indicates timing when the amplitude value L of the received signal D0 exceeds the threshold potential Vth1. The data D2 input into the amplitude adjustment circuit 420 is input into the waveform shaping circuits 426 after the amplitude thereof being adjusted.

Similarly, when the received signal D0 is input into the comparator 422, the amplitude value L of the received signal D0 and the threshold potential Vth2 are compared. For example, if L≧Vth2, the comparator 422 outputs the determination value 1 and, if L<Vth2, the determination value 0. Then, data D3 (determination value 0/1) output from the comparator 422 is input into the amplitude adjustment circuit 424. The data D3 indicates timing when the amplitude value L of the received signal D0 exceeds the threshold potential Vth2. The data D3 input into the amplitude adjustment circuit 424 is input into the waveform shaping circuit 426 after the amplitude thereof being adjusted.

As described above, the waveform shaping circuit 426 has the clock signal D4 input from the amplitude adjustment circuit 416 and the data D2 input from the amplitude adjustment circuit 420. Also, the waveform shaping circuit 428 has a reversed signal of the clock signal D4 input from the amplitude adjustment circuit 416 and the data D2 after the waveform thereof being shaped input from the amplitude adjustment circuit 426. Thus, the waveform of the data D2 output from the amplitude adjustment circuit 420 is shaped by the waveform shaping circuits 426 and 428 in such a way that the data D2 is synchronized with the clock signal D4 and the reversed signal of the clock signal D4 respectively. Then, data D5 output from the waveform shaping circuit 428 is input into the EX-NOR circuit 432.

On the other hand, the waveform shaping circuit 430 has the clock signal D4 input from the amplitude adjustment circuit 416 and the data D3 output from the amplitude adjustment circuit 424. Thus, the waveform of the data D3 output from the amplitude adjustment circuit 424 is shaped by the waveform shaping circuit 430 in such a way that the data D3 is synchronized with the reversed signal of the clock signal D4. Then, data D6 output from the waveform shaping circuit 430 is input into the EX-NOR circuit 432.

As described above, the EX-NOR circuit 432 has the data D5 input from the waveform shaping circuit 428 and the data D6 input from the waveform shaping circuit 430. The EX-NOR circuit 432 reverses and outputs an output result of an exclusive OR (EX-OR) operation. A logical operation is performed on the data D5 and the data D6 by the EX-NOR circuit 432 and an operation result is decoded into data D7 in NRZ coding mode. Then, the data D7 is input into the waveform shaping circuit 434. The waveform shaping circuit 434 already has the reversed signal of the clock signal D4 input from the amplitude adjustment circuit 416. Thus, the waveform of the data D7 is shaped by the waveform shaping circuit 434 in such a way that the data D7 is synchronized with the reversed signal of the clock signal D4 and the amplitude thereof is adjusted by the amplitude adjustment circuit 436 before the data D7 being output toward the S/P conversion unit 176.

Here, the flow of decoding processing by the above decoding processing unit 410 will be described with reference to FIG. 16 and FIG. 17. In FIG. 16, the clock signal D4 reproduced from the received signal D0 and the output data D2 and D3 of the comparators 418 and 422 are shown. In FIG. 17, the output data D5 of the waveform shaping circuit 428, the output data D6 of the waveform shaping circuit 430, and the output data D7 of the EX-NOR circuit 432 are shown.

First, FIG. 16 will be referenced. As shown in FIG. 16, the received signal D0 has a shape in which polarity is reversed in each period. The threshold potential Vth0 is set in the central value 0 of amplitude of the encoded signal (CMI) and the clock signal (CLK). Thus, timing of the rise and fall of the received signal D0 can be detected by comparing the threshold potential Vth0 and the amplitude value L of the received signal D0. If timing of the rise and fall of the received signal D0 is detected, the clock signal D4 is reproduced by synchronizing a signal of a predetermined amplitude with the detection result (D1).

The received signal D0 also has a shape having amplitudes "+3", "+1", "−1", and "−3" corresponding to the transmission signal (Output) shown in FIG. 14. The threshold potential Vth1 is used with respect to this signal to detect the data D2 showing a period in which the amplitude value L of the received signal D0 exceeds the amplitude "+2". Similarly, the threshold potential Vth2 is used to detect the data D3 showing a period in which the amplitude value L of the received signal D0 falls below the amplitude "−2". A period in which the amplitude value L of the received signal D0 falls below the amplitude "−2" can be obtained by reversing the data D3. Thus, a period in which the amplitude value L of the received signal D0 is "+3" and a period in which the amplitude value L of the received signal D0 is "−3" are detected.

Next, FIG. 17 will be referenced. When, as described above, the clock signal D1 and data D2 are detected from the received signal D0, the data D2 is shaped in such a way that the data D2 is synchronized with the clock signal D1 to generate the data D5. On the other hand, when the clock signal D1 and data D3 are detected from the received signal D0, the data D3 is shaped in such a way that the data D3 is synchronized with the reversed signal of the clock signal D1 to generate the data D6. As described above, a logical operation is performed on the data D5 and the data D6 by the EX-NOR circuit 432 to generate the data D7 in NRZ coding mode. That is, the data before being encoded by the encoder 402 is restored.

In the present embodiment, as described above, the encoded signal (CMI), the central value of amplitude of which is adjusted to 0 by the encoder 402, is synchronously added to the clock signal (CLK), the central value of amplitude of which is similarly adjusted to 0, before transmission. Therefore, the amplitude value of the transmission signal input into the decoding processing unit 410 is DC-free. Moreover, a clock signal can be reproduced without using any PLL in the decoding processing unit 410. Further, by using the reproduced clock signal, as shown in the above circuit configuration example, data in NRZ coding mode can be restored by only two comparators. Power consumption on the receiving side can significantly be reduced by an amount corresponding to eliminated PLL. Further, two comparators are sufficient for data determination, contributing to a further reduction in power consumption.

[Application to a CRV Added CMI Code]

Next, the encoding method according to the present embodiment when a CRV added CMI code is used will be described with reference to FIG. 18 to FIG. 20.

CRV means a code rule violation. In the case of CMI code, when data "1" originally input is encoded, data "1" input this time is encoded into a CMI code "11" if the CMI code corresponding to data "1" input last time is "00". However, in the case of CRV added CMI code, data "1" input this time may be encoded into the CMI code "00" even if, for example, the CMI code corresponding to data "1" input last time is "00". Another encoding example of the CRV added CMI code is encoding of data, which should be encoded into "01", into "10".

(Generation Method of a CRV Added CMI Code)

First, encoding rules for a CRV added CMI code and the generation method of a CRV added CMI code will be described with reference to FIG. 18. FIG. 18 is an explanatory view showing encoding rules for a CRV added CMI code and the encoding method thereof. As described above, encoding of a CRV added CMI code is a method by which the above CRV is generated on purpose and additional data is encoded by using the position and state of the CRV. FIG. 18 summarizes state transitions realizable by this method.

Figure 18:
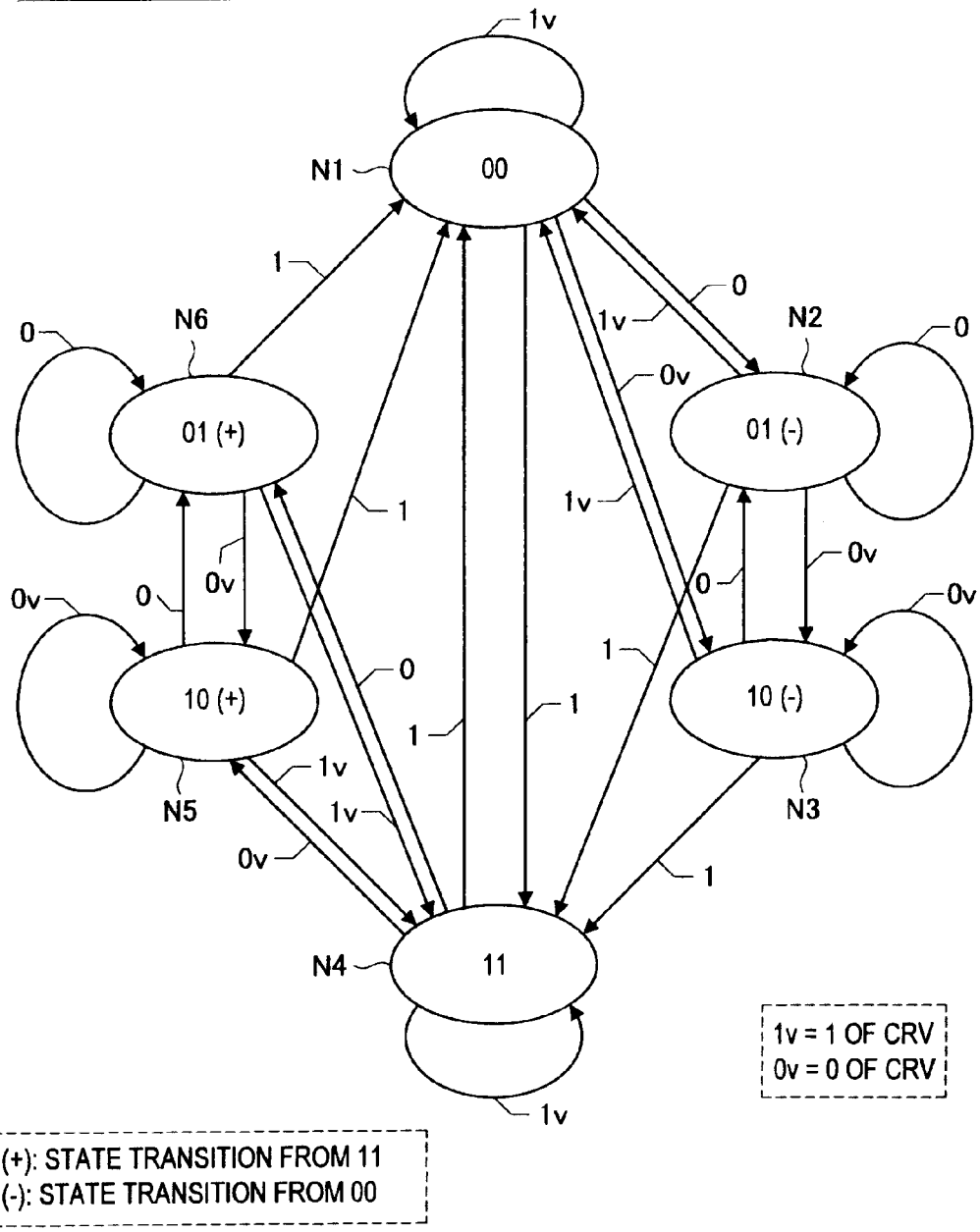
FIG. 18 shows coding rules in a mode in the present embodiment.

In FIG. 18, six states (N1, N2, N3, N4, N5, and N6) including the state of CRV and transition directions between states are shown. The state N1 corresponds to data "00" of the CMI code. The state N2 corresponds to data "01(−)" of the CMI code. The state N3 corresponds to data "10(−)" of the CMI code. The state N4 corresponds to data "11" of the CMI code. The state N5 corresponds to data "10(+)" of the CMI code. The state N6 corresponds to data "01(+)" of the CMI code.

In FIG. 18, the symbol (+) indicates a transition from the state "11". Also, the symbol (−) indicates a transition from the state "00". Further, 0v means a CRV for data 0 of the NRZ code. Then, 1v means a CRV for data 1 of the NRZ code. That is, input of an additional sequence of data that is different from a main sequence of data is represented by 0v and 1v.

First, transitions starting from the state N1 include (1-1) a transition from the state N1 to the state N2, (1-2) that from the state N1 to the state N3, (1-3) that from the state N1 to the state N4, and (1-4) that from the state N1 back to the state N1.

(1-1) The transition from the state N1 to the state N2 occurs when data "0" of the NRZ code is input. That is, this transition means that the newly input data "0" of the NRZ code is converted into data "01" of the CMI code if data of the CMI code immediately before is "00". (1-2) The transition from the state N1 to the state N3 occurs when data "0v" of the NRZ code is input. That is, this transition means that the newly input data "0v" of the NRZ code is converted into data "10" of the CMI code if data of the CMI code immediately before is "00".

(1-3) The transition from the state N1 to the state N4 occurs when data "1" of the NRZ code is input. That is, this transition means that the newly input data "1" of the NRZ code is converted into data "11" of the CMI code if data of the CMI code immediately before is "00". (1-4) The transition from the state N1 back to the state N1 occurs when data "1v" of the NRZ code is input. That is, this transition means that the newly input data "1v" of the NRZ code is converted into data "00" of the CMI code if data of the CMI code immediately before is "00".

Transitions starting from the state N2 include (2-1) a transition from the state N2 to the state N3, (2-2) that from the state N2 back to the state N2, (2-3) that from the state N2 to the state N4, and (2-4) that from the state N2 to the state N1.

(2-1) The transition from the state N2 to the state N3 occurs when data "0v" of the NRZ code is input. That is, this transition means that the newly input data "0v" of the NRZ code is converted into data "10" of the CMI code if data of the CMI code immediately before is "01". (2-2) The transition from the state N2 back to the state N2 occurs when data "0" of the NRZ code is input. That is, this transition means that the newly input data "0" of the NRZ code is converted into data "01" of the CMI code if data of the CMI code immediately before is "01".

(2-3) The transition from the state N2 to the state N4 occurs when data "1" of the NRZ code is input. That is, this transition means that the newly input data "1" of the NRZ code is converted into data "11" of the CMI code if data of the CMI code immediately before is "01". (2-4) The transition from the state N2 to the state N1 occurs when data "1v" of the NRZ code is input. That is, this transition means that the newly input data "1v" of the NRZ code is converted into data "00" of the CMI code if data of the CMI code immediately before is "01".

Transitions starting from the state N3 include (3-1) a transition from the state N3 to the state N4, (3-2) that from the state N3 back to the state N3, (3-3) that from the state N3 to the state N1, and (3-4) that from the state N3 to the state N2.

(3-1) The transition from the state N3 to the state N4 occurs when data "1" of the NRZ code is input. That is, this transition means that the newly input data "1" of the NRZ code is converted into data "11" of the CMI code if data of the CMI code immediately before is "10". (3-2) The transition from the state N3 back to the state N3 occurs when data "0v" of the NRZ code is input. That is, this transition means that the newly input data "0v" of the NRZ code is converted into data "10" of the CMI code if data of the CMI code immediately before is "10".

(3-3) The transition from the state N3 to the state N1 occurs when data "1v" of the NRZ code is input. That is, this transition means that the newly input data "1v" of the NRZ code is converted into data "00" of the CMI code if data of the CMI code immediately before is "10". (3-4) The transition from the state N3 to the state N2 occurs when data "0" of the NRZ code is input. That is, this transition means that the newly input data "0" of the NRZ code is converted into data "01" of the CMI code if data of the CMI code immediately before is "10".

Transitions starting from the state N4 include (4-1) a transition from the state N4 to the state N5, (4-2) that from the state N4 back to the state N4, (4-3) that from the state N4 to the state N1, and (4-4) that from the state N4 to the state N6.

(4-1) The transition from the state N4 to the state N5 occurs when data "0v" of the NRZ code is input. That is, this transition means that the newly input data "0v" of the NRZ code is converted into data "10" of the CMI code if data of the CMI code immediately before is "11". (4-2) The transition from the state N4 back to the state N4 occurs when data "1v" of the NRZ code is input. That is, this transition means that the newly input data "1v" of the NRZ code is converted into data "11" of the CMI code if data of the CMI code immediately before is "11".

(4-3) The transition from the state N4 to the state N1 occurs when data "1" of the NRZ code is input. That is, this transition means that the newly input data "1" of the NRZ code is converted into data "00" of the CMI code if data of the CMI code immediately before is "11". (4-4) The transition from the state N4 to the state N6 occurs when data "0" of the NRZ code is input. That is, this transition means that the newly input data "0" of the NRZ code is converted into data "01" of the CMI code if data of the CMI code immediately before is "11".

Transitions starting from the state N5 include (5-1) a transition from the state N5 to the state N6, (5-2) that from the state N5 back to the state N5, (5-3) that from the state N5 to the state N1, and (5-4) that from the state N5 to the state N4.

(5-1) The transition from the state N5 to the state N6 occurs when data "0" of the NRZ code is input. That is, this transition means that the newly input data "0" of the NRZ code is converted into data "01" of the CMI code if data of the CMI code immediately before is "10". (5-2) The transition from the state N5 back to the state N5 occurs when data "0v" of the NRZ code is input. That is, this transition means that the newly input data "0v" of the NRZ code is converted into data "10" of the CMI code if data of the CMI code immediately before is "10".

(5-3) The transition from the state N5 to the state N1 occurs when data "1" of the NRZ code is input. That is, this transition means that the newly input data "1" of the NRZ code is converted into data "00" of the CMI code if data of the CMI code immediately before is "10". (5-4) The transition from the state N5 to the state N4 occurs when data "1v" of the NRZ code is input. That is, this transition means that the newly input data "1v" of the NRZ code is converted into data "11" of the CMI code if data of the CMI code immediately before is "10".

Transitions starting from the state N6 include (6-1) a transition from the state N6 to the state N5, (6-2) that from the state N6 back to the state N6, (6-3) that from the state N6 to the state N1, and (6-4) that from the state N6 to the state N4.

(6-1) The transition from the state N6 to the state N5 occurs when data "0v" of the NRZ code is input. That is, this transition means that the newly input data "0v" of the NRZ code is converted into data "10" of the CMI code if data of the CMI code immediately before is "01". (6-2) The transition from the state N6 back to the state N6 occurs when data "0" of the NRZ code is input. That is, this transition means that the newly input data "0" of the NRZ code is converted into data "01" of the CMI code if data of the CMI code immediately before is "01".

(6-3) The transition from the state N6 to the state N1 occurs when data "1" of the NRZ code is input. That is, this transition means that the newly input data "1" of the NRZ code is converted into data "00" of the CMI code if data of the CMI code immediately before is "01". (6-4) The transition from the state N6 to the state N4 occurs when data "1v" of the NRZ code is input. That is, this transition means that the newly input data "1v" of the NRZ code is converted into data "11" of the CMI code if data of the CMI code immediately before is "01".

Thus, by using a state transition diagram as shown in FIG. 18, transitions between states are represented without omission by covering all CRV added CMI coding rules. That is, the coding method of the CRV added CMI code is executed based on the state transition diagram in FIG. 18. By using the above CRV, an additional sequence of data that is different from a main sequence of data transmitted by an ordinary CMI code can be transmitted. For example, a sequence of additional data transmitted based on a CRV added CMI code is decoded using presence/absence of CRV.

Thus, if a CRV added CMI code is used, in addition to a main sequence of data, an additional sequence of data can be transmitted only by inserting an error into a sequence of CMI code. If the insertion rate of CRV increases in an ordinary CMI code, the lock-in time on synchronization grows, causing the CMI code to step out of synchronization. In the present embodiment, however, a clock signal is synchronously added to a CMI code before transmission so that there is no need for block synchronization of the CMI code. Therefore, even when the insertion rate of CRV is high, block synchronization of the CMI code will not step out.

However, with an increasing insertion rate of CRV, a DC offset may be shifted. Thus, the method of correcting a DC offset caused by insertion of CRV will be described below.

(Correction Method of a DC Offset)

Next, the correction method of a DC offset will be described with reference to FIG. 19 and FIG. 20. FIG. 19 is an explanatory view showing a function configuration example of a DC offset correction unit 450. FIG. 20 is an explanatory view showing the correction method of a DC offset. The DC offset correction unit 450 is contained in the encoder 402 and is a means to calculate a correction value of the DC offset and to insert the correction value into a portion of the data frame.

Figure 19:
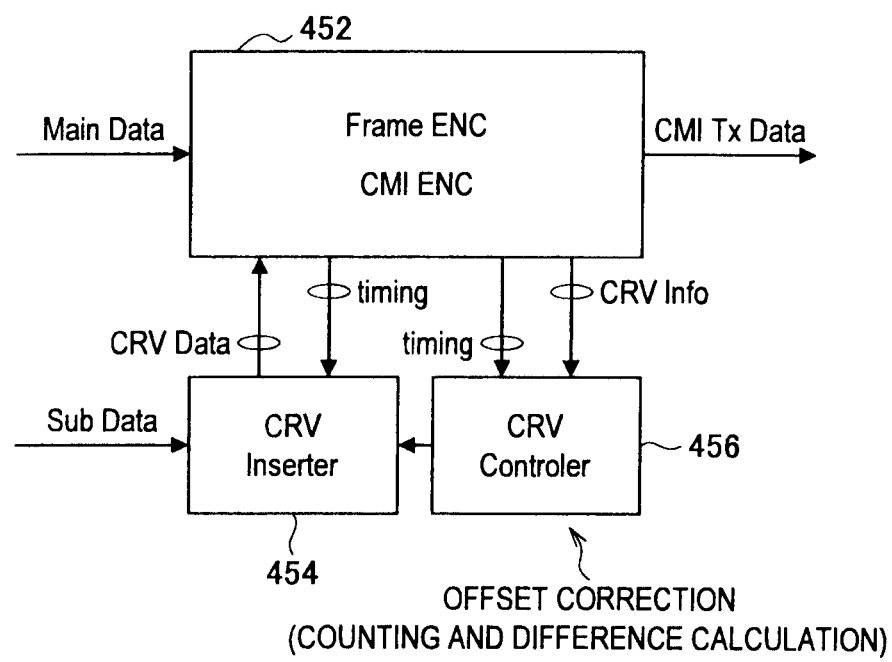
FIG. 19 shows a configuration example of a DC offset correction means according to the present embodiment.

First, FIG. 19 will be referenced. As shown in FIG. 19, the DC offset correction unit 450 has an encoder 452, a CRV inserter 454, and a CRV controller 456. The encoder 452 includes a frame encoder (Frame ENC) to generate a data frame and a CMI encoder (CMI ENC) to generate a CMI code.

First, a main sequence of data (Main Data) is input into the encoder 452. On the other hand, additional data (Sub Data) is input into the CRV inserter 454 (CRV Inserter). The CRV inserter 454 converts the additional data into presence/absence of CRV in frame timing of a data frame. The additional data (CRV Data) represented by presence/absence of CRV by the CRV inserter 454 is input into the encoder 452. After the additional data being input from the CRV inserter 454, the encoder 452 inserts the additional data based on CRV added CMI coding rules shown in FIG. 18 when the main sequence of data is encoded into CMI code.

Next, the CRV controller 456 notifies the CRV inserter 454 of the numbers of "00" and "11" contained in the CMI code into which the additional data has been inserted. In this case, the CRV controller 456 may be configured to calculate a difference between the number of "00" and that of "11" to notify the CRV inserter 454 of the difference. If, for example, the number of "00" is larger than that of "11" by 3, "+3" is notified from the CRV controller to the CRV inserter 454. The CRV inserter 454 decides additional data (CRV Data) for offset correction in frame timing and inputs the additional data into the encoder 452. The encoder 452 encodes the additional data input for offset correction from the CRV inserter 454 based on the CRV added CMI coding rules shown in FIG. 18.

Here, the calculation method of data for offset correction will be described by citing a concrete example with reference to FIG. 20. In FIG. 20, a data frame (transmission data) of CMI code containing CRV encoded based on the CRV added CMI coding rules shown in FIG. 18 is shown. As described above, an encoded signal (CMI) of CMI code is adjusted so that the central value of amplitude thereof becomes 0. For example, data 1 of the CMI code is adjusted to potential 1 and data 0 of the CMI code is adjusted to potential −1. Thus, if the number of bit value 0 and that of bit value 1 are not equal in each frame, a DC offset is generated.

Thus, in the present embodiment, bit values contained in a data frame are adjusted so that an encoded signal becomes DC-free in each data frame by adding data for offset correction to correct the DC offset to the data frame. To make the offset correction, a storage area for offset correction data is provided in a data frame according to the present embodiment. A portion denoted as "Offset correction area" in FIG. 20 is the storage area of offset correction data.

First, data frames (transmission data) for CRV added CMI code are generated by the encoder 452. In the example in FIG. 20, CRV (1v) of data 1 is contained in an underlined portion of the data frame. Next, after the data frames are generated by the encoder 452, an offset is calculated for each frame. As described above, the difference between the number of bit values 0 and that of bit values 1 becomes the offset. That is, if the number of bit values 1 is half the number of bit values contained in one frame, no offset arises.

Thus, like an "Offset calculation" column illustrated in FIG. 20, the CRV controller 456 successively adds the bit value from the start of a data frame to determine whether it is necessary to make an offset correction from the bit value (addition value) added till the end of the data frame excluding the offset correction area. In the example in FIG. 20, the addition value of for six codes (12 bits) of the CMI code is 5. Therefore, the addition value/number of bits (X)=6/12−1/12<0.5. In this case, the addition value/number of bits (X) is less than 0.5 and an offset correction is determined to be necessary for data 1 in the positive direction. If the addition value/number of bits (X)=0.5, an offset correction is determined to be unnecessary. If the addition value/number of bits (X)>0.5, an offset correction is determined to be necessary in the negative direction.

Next, the CRV inserter 454 inserts data for offset correction into the offset correction area so as to make the whole data frame including the offset correction area DC-free. In the example in FIG. 20, it is necessary, as described above, to make an offset correction in the positive direction for data 1 and thus, the CRV inserter 454 inserts the CMI code "11" corresponding to data 1 into the offset correction area. Further, the CRV inserter 454 inserts the CMI code "01" corresponding to data 0 into empty bits to pad all bits of the data frame including the offset CMI area with data.

Needless to say, an offset is not shifted even if "01" is inserted. The above offset correction becomes necessary only if CRV of data 1 is contained. Incidentally, the offset correction area is provided at the end of the data frame in the example in FIG. 20, but technology according to the present invention is not limited to this. For example, the offset correction area may be provided inside a data frame. In this case, an offset correction is made in a section between the start of a data frame and that of the offset correction area and there is no need to provide an offset correction area at the end of the data frame.

In the foregoing, the correction method of an offset according to the present embodiment has been described. By making the above offset correction, no DC offset arises even when the insertion frequency of CRV is increased. In the coding mode according to the present embodiment, a clock synchronized with data is transmitted by being superimposed on the data and thus, there is no need of CMI code synchronization on the receiving side and even if the insertion frequency of CRV is increased, there is no possibility for code synchronization to go out of synchronization. Therefore, a subsequence of data with a relatively large amount of information can be transmitted together with a main sequence of data by using CRV. For example, frame synchronization information or header information can be transmitted as a subsequence of data so that there is no need to insert frame synchronization bits or a header area into a data frame of a main sequence, eliminating the need for speed conversion when a main sequence of data is put into a transmission frame. Moreover, control information and the like can be transmitted as a subsequence of data.

[Summary]

Lastly, the function configuration held by a mobile terminal in the present embodiment and operation effects obtained from the function configuration will be briefly summarized. The mobile terminal has a first information processing module corresponding to the operation unit 108 and a second information processing module corresponding to the display unit 102.

The first information processing module has a data encoding unit, a clock signal addition unit, and a signal transmission unit described below. The data encoding unit is used to generate an encoded signal by encoding first input data based on CMI coding rules and encoding second input data using an error in the CMI coding rules. By generating an encoded signal in this manner, two sequences of data can be transmitted by the same data frame. For example, the second input data is encoded by using presence/absence of an error (CRV) of CMI coding rules.

The clock signal addition unit is used to generate a transmission signal by synchronously adding a clock signal having an amplitude value larger than that of an encoded signal to the encoded signal generated by the data encoding unit. The signal transmission unit is used to transmit the transmission signal generated by the clock signal addition unit. By generating a transmission signal in this manner, the transmission signal becomes a signal that contains no DC component and whose polarity is reversed in each period. As a result, the transmission signal can be transmitted by being superimposed on a power line of a DC power supply or the like. Further, by detecting rising timing or falling timing held by amplitudes of the transmission signal, a clock component can be detected from the transmission signal without using any PLL. As a result, power consumption can be reduced for the amount that no PLL is used on the receiving side. Further, a clock can be reproduced from the transmission signal and thus, there is no need for CMI code synchronization and even if the insertion frequency of CRV is increased, there is no possibility for code synchronization to go out of synchronization.

The data encoding unit may be configured so that the amplitude of the encoded signal is adjusted to make the central value of amplitude 0. In this case, the clock signal addition unit synchronously adds the clock signal to the encoded signal whose central value of amplitude is adjusted to 0 to generate a transmission signal. With the central values of amplitude of the transmission signal and clock signal adjusted to 0 in this manner, the average amplitude value of the transmission signal becomes 0 and the transmission signal becomes DC-free in each frame. Moreover, the number of amplitude values of an encoded signal used for data determination is limited to 2 in a positive area and 2 in the negative area so that, when compared with the AMI mode (3 in the positive are and 3 in the negative area), the number of amplitude values can be reduced. As a result, the range of amplitude of a transmission signal can be limited, contributing to a reduction in power consumption. Moreover, when compared with the above new mode, the number of comparators used for data determination can also be reduced.

A data frame to form the encoded signal may be provided with an area in which correction data to correct the average amplitude value of the encoded signal in the data frame is stored. In this case, the data encoding unit generates the encoded signal by storing correction data in the storage area of the correction data so that the average amplitude value of the encoded signal becomes 0. If many errors (CRV) of CMI coding rules are contained, a DC offset arises and when superimposed on a power line or the like, a data error may occur. However, if adjustments are made by using correction data so that no offset arises in each frame, as described above, a data error that occurs when a transmission signal is superimposed on a power line or the like can be prevented. As a result, many errors (CRV) of CMI coding rules can be inserted so that second input data with a relatively large amount of information can be transmitted.

The second information processing module may include a signal receiving unit and a clock component detection unit described below. The signal receiving unit is used to receive the transmission signal via a predetermined transmission line. The clock component detection unit is used to detect a clock component contained in a transmission signal based on a reversal period by detecting the reversal period of polarity held by the transmission signal received by the signal receiving unit. In this case, the input data decoding unit uses the clock component detected by the clock component detection unit to decode the first and second input data. Since, as described above, the clock signal is synchronously added to the transmission signal, a clock can be reproduced without using any PLL by detecting the polarity reversal period. Thus, the clock can be reproduced from the transmission signal so that the need for CMI code synchronization can be eliminated and even if the insertion frequency of CRV is increased, there is no possibility for code synchronization to go out of synchronization.

The predetermined transmission line may be a power line through which a DC current is passed. In this case, the transmission signal is transmitted after being superimposed on the DC current by the signal transmission unit and separated from the DC current by the signal receiving unit. Thus, input data and a clock signal can be transmitted only by one power line by superimposing the transmission signal on the power line. Therefore, flexibility of a portion connecting the first and second information processing modules is increased so that designability of a mobile terminal as a whole can be enhanced.

(Notes)

The encoders 402 and 452, the DC offset correction unit 450, and the CRV inserter 454 are examples of the data encoding unit. The encoder 402 is an example of the clock signal addition unit. The driver 156 and the superimposing unit 232 are examples of the signal transmission unit. The separation unit 234 and the receiver 172 are examples of the signal receiving unit. The clock detection unit 406 is an example of the clock component detection unit.

It should be understood by those skilled in the art that various modifications, combinations, sub-combinations and alterations may occur depending on design and other factors insofar as they are within the scope of the appended claims or the equivalents thereof.

In the above description, a case in which technology of the present embodiment is applied to signal transmission between the serializer 134 and the deserializer 138 forming the mobile terminal 400 is illustrated and technology of the present embodiment is described based on this example. However, technology of the present embodiment can be used when a signal is transmitted between two information processing modules having any configuration. The two information processing modules may be formed as separate apparatuses.

For example, technology of the present embodiment can be applied to a case in which two information processing modules are connected by a power line and a signal is transmitted via the power line. The type of such information processing modules or mobile terminals is arbitrary and includes, for example, mobile information terminals such as mobile phones, PHS (Personal Handy-phone System), and PDA (Personal Digital Assistant). Further, imaging devices, broadcasting equipment, home game machines, TV sets, and recording/reproducing devices are also included in the information processing modules or mobile terminals.

The present application contains subjected matter related to that disclosed in Japanese Priority Patent Application JP 2008-230070 filed in the Japan Patent Office on Sep. 8, 2008, the entire contents of which is hereby incorporated by reference.

What is claimed is:

1. An information processing apparatus, comprising:
   a data encoding circuit that generates an encoded signal by encoding first input data based on CMI (Coded Mark Inversion) coding rules and encoding second input data based on the CMI coding rules combined with a CRV (Code Rule Violation);
   a clock signal addition unit that generates a transmission signal by synchronously adding a clock signal having an amplitude value larger than that of the encoded signal to the encoded signal; and
   a signal transmission unit that transmits the transmission signal.

2. An information processing apparatus comprising:
   a data encoding unit that generates an encoded signal by encoding first input data based on CMI (Coded Mark Inversion) coding rules and encoding second input data based on the CMI coding rules combined with a CRV (Code Rule Violation);
   a clock signal addition unit that generates a transmission signal by synchronously adding a clock signal having an amplitude value larger than that of the encoded signal to the encoded signal; and
   a signal transmission unit that transmits the transmission signal, wherein
      the data encoding unit adjusts amplitudes of the encoded signal so that a central value of amplitude becomes 0 and
      the clock signal addition unit generates the transmission signal by synchronously adding the clock signal to the encoded signal whose central value of amplitude is adjusted to 0.

3. The information processing apparatus according to claim 2, wherein
   a data frame to form the encoded signal is provided with an area in which correction data to correct an average amplitude value of the encoded signal in the data frame is stored and
   the data encoding unit generates the encoded signal by storing the correction data in the storage area of the correction data so that the average amplitude value of the encoded signal becomes 0.

4. The information processing apparatus according to claim 2, further comprising:
   a signal receiving unit that receives the transmission signal via a predetermined transmission line;
   a clock component detection unit that detects a clock component contained in the transmission signal based on a reversal period by detecting the reversal period of polarity held by the transmission signal received by the signal receiving unit; and
   an input data decoding unit that uses the clock component to decode the first and second input data.

5. The information processing apparatus according to claim 4, wherein
   the predetermined transmission line is a power line through which a DC current is passed and
   the transmission signal is transmitted after being superimposed on the DC current by the signal transmission unit and separated from the DC current by the signal receiving unit.

6. An encoding method comprising the steps of:
   generating an encoded signal by an encoding circuit by encoding first input data based on CMI (Coded Mark Inversion) coding rules and encoding second input data based on the CMI coding rules combined with a CRV (Code Rule Violation); and
   generating a transmission signal transmitted through a predetermined transmission line by synchronously adding a clock signal having an amplitude value larger than that of the encoded signal to the encoded signal.

7. A signal transmission method comprising the steps of:
   generating an encoded signal by encoding first input data based on CMI (Coded Mark Inversion) coding rules and encoding second input data based on the CMI coding rules combined with a CRV (Code Rule Violation);
   generating a transmission signal by synchronously adding a clock signal having an amplitude value larger than that of the encoded signal to the encoded signal;
   transmitting the transmission signal;
   receiving the transmission signal via a predetermined transmission line;
   detecting a clock component contained in the transmission signal based on a reversal period by detecting the reversal period of polarity held by the transmission signal; and
   decoding the first and second input data by using the clock component.

* * * * *